(12) United States Patent
Hiramatsu

(10) Patent No.: US 7,693,332 B2
(45) Date of Patent: Apr. 6, 2010

(54) IMAGE PROCESSING APPARATUS CAPABLE OF GENERATING DISTRIBUTABLE IMAGE WHILE MAINTAINING READABILITY AND SECURITY

(75) Inventor: Naoko Hiramatsu, Kyoto (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 947 days.

(21) Appl. No.: 11/206,132

(22) Filed: Aug. 18, 2005

(65) Prior Publication Data
US 2006/0256409 A1 Nov. 16, 2006

(30) Foreign Application Priority Data
May 10, 2005 (JP) ............... 2005-137377

(51) Int. Cl.
*G06K 9/00* (2006.01)
(52) U.S. Cl. ...................................... 382/181
(58) Field of Classification Search ............... None
See application file for complete search history.

(56) References Cited

U.S. PATENT DOCUMENTS

| 5,149,140 | A | 9/1992 | Mowry, Jr. et al. |
| 6,256,110 | B1 | 7/2001 | Yoshitani |
| 6,414,757 | B1 | 7/2002 | Salem |
| 6,823,081 | B2 | 11/2004 | Lee et al. |
| 2004/0051885 | A1* | 3/2004 | Matsunoshita ............. 358/1.9 |
| 2005/0078331 | A1 | 4/2005 | Guan et al. |

FOREIGN PATENT DOCUMENTS

| JP | 2002-237940 | 8/2002 |
| JP | 2004-274092 | 9/2004 |

* cited by examiner

*Primary Examiner*—Vikkram Bali
*Assistant Examiner*—Elisa M Rice
(74) *Attorney, Agent, or Firm*—Buchanan Ingersoll & Rooney PC

(57) ABSTRACT

An image input from an image input unit is divided into a ground portion and a document other than the ground portion in an image divider, and a latent image is extracted from a ground pattern included in the ground portion in a latent image extractor. Lightness of the latent image is corrected to be closer to lightness of the document in a lightness corrector, and a color of the latent image is converted into a gradation A in a latent image converter. A color of the document is converted in a document converter into a gradation B including the same plurality of colors as gradation A and having a different manner of gradation. The latent image and the document are integrated in an image integrator to generate an image including the latent image and the document having similar lightness with a difference in hues superposed on each other.

14 Claims, 28 Drawing Sheets

FIG.7A PATTERN 1 PATTERN 2
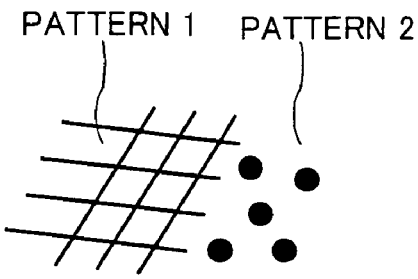
FIG.7B
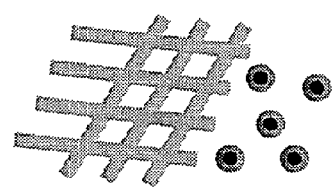
FIG.8A PATTERN 1 PATTERN 2
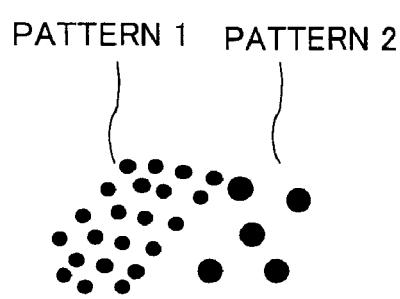
FIG.8B
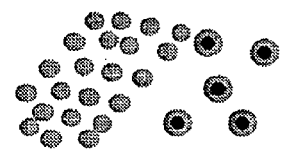

禁止禁止
止禁止禁
禁止禁止
止禁止禁 abcdefghijklmnop qrstuvwxyzABCDEF

GHIJKLMNOPQRSTUV

WXYZabcdefghijkl mnopqrstuvwxyzAB

IMAGE PROCESSING APPARATUS CAPABLE OF GENERATING DISTRIBUTABLE IMAGE WHILE MAINTAINING READABILITY AND SECURITY This application is based on Japanese Patent Application No. 2005-137377 filed with the Japan Patent Office on May 10, 2005, the entire content of which is hereby incorporated by reference.

BACKGROUND OF THE INVENTION

1. Field of the Invention

The present invention relates to an image processing apparatus and an image processing program product. More specifically, the present invention relates to an image processing apparatus and an image processing program product for processing image data obtained by scanning of a document image having a ground pattern for preventing replication.

2. Description of the Related Art

Since performance of an image processing apparatus such as a copier or a printer has been improved, a high quality replica of a document image can be easily made utilizing such apparatus. Therefore, it becomes critical to prevent improper replication.

To prevent improper replication of a document image, Japanese Laid-Open Patent Publication No. 2002-237940, for example, suggests an image processing apparatus which converts a classified document into a color which is hard to reproduce by copying in a step of superposing a document image on a background image and outputting the result. In addition, Japanese Laid-Open Patent Publication No. 2004-274092 suggests a technique to include in a document image a ground pattern for preventing replication.

FIGS. 36A and 36B show an example of a ground pattern contemplated in the present invention. As shown in FIG. 36B, which is an enlarged view of the ground pattern shown in FIG. 36A, the ground pattern is formed with a combination of a plurality of patterns having different resolutions. More specifically, referring to FIG. 36B, the ground pattern is a background image of a combination of a pattern 1 (a "ground" portion) formed with lines of a high screen ruling and a pattern 2 (a "pattern" portion) formed with dots of a low screen ruling.

FIGS. 37A and 37B show a specific example of a document image having a ground pattern superposed as a background image. When the document image having the ground pattern shown in FIG. 37A is copied, pattern 1 which is a pattern of thin lines is obtained as pale gray dots, while pattern 2 which is a pattern of large dots is obtained as separate black points with a resolution of a scanner. Thereafter, a pale pattern of pattern 1 is removed with a ground-removal function of a copier and only black points of pattern 2 remain as shown in FIG. 37B, resulting in appearance of a latent image formed with pattern 2 indicating that a resulting document is a copy.

Since an effect of the ground pattern for preventing replication varies depending on a resolution property or an amount of the ground removal of the copier, however, sometimes a sufficient effect cannot be obtained when the ground pattern for preventing replication is scanned with a scanner and converted into electronic data, depending on a setting of a scan. In addition, since the electronic data obtained with the scan can be processed to freely change lightness or the like, the ground pattern for preventing replication can be easily removed by image processing.

FIG. 38 is a flow chart of a specific example of processing executed in a conventional image processing apparatus to erase the ground pattern. FIGS. 39A and 39B show specific examples of images obtained in respective steps of the flow chart of FIG. 38 when the document image having the ground pattern shown in FIG. 37A is specifically processed.

Referring to FIG. 38, by scanning the document image having the ground pattern with a high resolution and inputting electronic data (step S1), the ground pattern is accurately input at a halftone level.

Then, a smoothing filter is applied to this image data to perform smoothing so as to decrease a density of a ground region to which the ground pattern belongs (step S2). FIG. 39A shows a specific example of an image obtained with the smoothing in step S2 when the document image having the ground pattern shown in FIG. 37A is input in step S1. Referring to FIG. 39A, by applying the smoothing filter having a size larger than a width of a line forming pattern 1 and smaller than a size of a dot forming pattern 2 in step S2, a tone difference is generated between pattern 1 and pattern 2, and pattern 2 of at least a prescribed density is deleted by decreasing the density.

Furthermore, a tone is changed so as to remove the ground region to remove the ground pattern (step S3). FIG. 39B shows a specific example of an image obtained with changing the tone in step S3 when the image shown in FIG. 39A is obtained in step S2. Referring to FIG. 39B, the ground pattern for preventing replication can be erased in step S3 by emphasizing a tone difference between the ground pattern, in which pattern 2 is deleted in step S2 and only pattern 1 remains, and the other elements to delete a tone level of the ground pattern.

To prevent such removal of the ground pattern, a technique has been proposed in which a watermark is printed with the ground pattern and a scan itself is prohibited when the watermark is sensed. With this technique, a scan can be prevented independently of a property of a scanner.

An effect as described above, however, cannot be obtained with a document image with a ground pattern which is output from a machine not carrying such watermark technique or an old machine manufactured before introduction of the watermark technique. In addition, distribution of the document also becomes impossible because the scan itself is prohibited.

SUMMARY OF THE INVENTION

The present invention is made in view of the above-described problems. An object of the present invention is to provide an image processing apparatus and an image processing program for scanning a document image having a ground pattern for preventing replication to obtain image data, each prevents the ground pattern from being easily removed with image processing to generate a distributable image with maintaining readability and security.

To attain the object, an image processing apparatus according to an aspect of the present invention includes a ground pattern detector for detecting a ground pattern from a ground of an image input, a latent image extractor for extracting a latent image from the ground, a lightness corrector for correcting lightness of the latent image to become closer to lightness of an element of the image other than the ground, a latent image converter for converting a color of the latent image into a first plurality of colors formed with a plurality of different colors excluding a background color for outputting and varying from one to another via a neutral color, and a converter for converting a color of the element of the image other than the ground into a second plurality of colors formed with the plurality of different colors as the first plurality of colors and varying in a manner different from that of the first plurality of colors.

According to another aspect of the present invention, in an image processing program product for making a computer execute image processing in an image processing apparatus including an image input unit and an image output unit, the image processing includes the steps of detecting a ground pattern from a ground of an image input from the image input unit, extracting a latent image from the ground, correcting lightness of the latent image to become closer to lightness of an element of the image other than the ground, converting a color of the latent image into a first plurality of colors formed with a plurality of different colors excluding a background color for outputting at the image output unit and varying from one to another via a neutral color, and converting a color of the element of the image other than the ground into a second plurality of colors formed with the plurality of different colors as the first plurality of colors and varying in a manner different from that of the first plurality of colors.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIGS. 7A and 7B are diagrams for describing a smoothing process in step S107.

FIGS. 8A and 8B are diagrams for describing another specific example of a ground pattern contemplated in the present invention.

FIGS. 13A and 13B show a specific example of a document image having a ground pattern, which has corrected lightness of a latent image region image.

FIG. 22 shows a specific example of an image obtained in step S211.

FIG. 23 shows a specific example of an image obtained in step S215.

FIG. 24 shows a specific example of an image obtained in step S219.

FIG. 27 shows a specific example of an image obtained in step S207.

DESCRIPTION OF THE PREFERRED EMBODIMENTS

Figure 1:
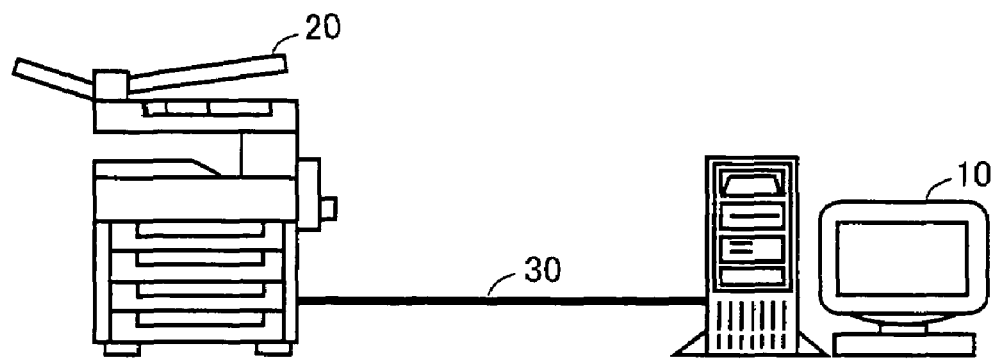
FIG. 1 shows a specific example of a construction of an image processing system including an MFP which is an image processing apparatus according to an embodiment of the present invention.

Embodiments of the present invention will now be described referring to the drawings. In the following description, the same parts and elements are indicated with the same characters. Since names and functions thereof are the same, detailed descriptions thereof will not be repeated.

Referring to FIG. 1, an image processing system includes an MFP 20, a multifunction image processing apparatus functioning as a printer, a scanner, a copier and the like, which is an image processing apparatus according to an embodiment of the present invention, and an information processing terminal 10 such as a computer. MFP 20 and information processing terminal 10 are connected to each other via a network 30 such as an LAN (Local Area Network) (or a parallel connection). Information processing terminal 10 inputs a designation signal to MFP 20 via network 30 to request for image reading, printing and the like. MFP 20 executes such processing according to the designation signal.

Figure 2:
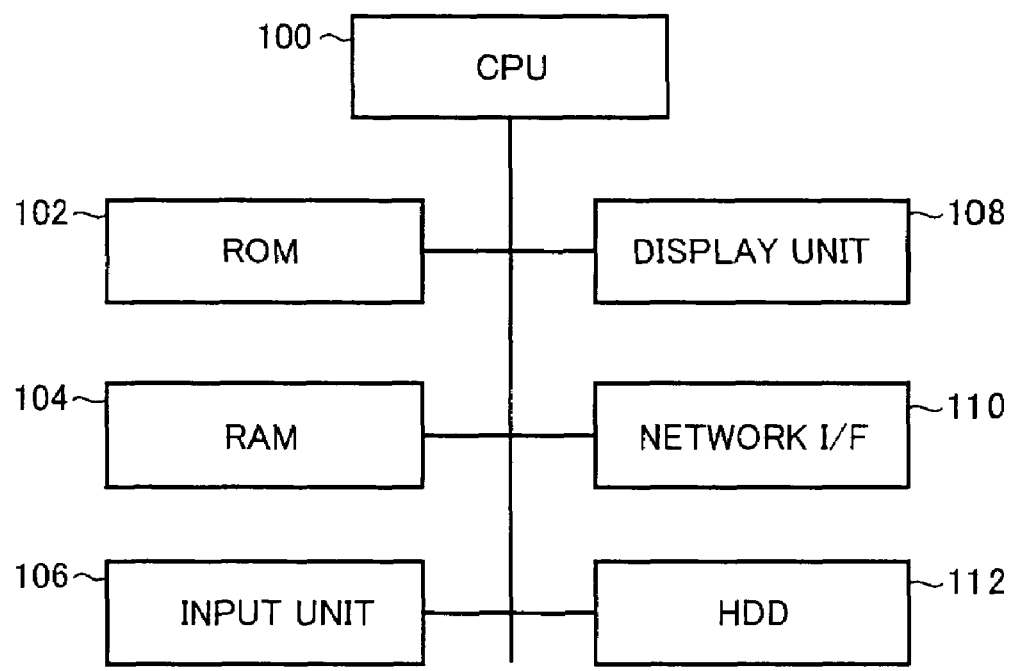
FIG. 2 shows a specific example of a hardware construction of a computer as an example of an information processing terminal 10.

Referring to FIG. 2, information processing terminal 10 includes a CPU (Central Processing Unit) 100 for executing a program to control a whole of information processing terminal 10. CPU 100 is connected to an ROM (Read Only Memory) 102 storing a program or data executed in CPU 100, an RAM (Random Access Memory) 104 storing various programs or data and also functioning as a working region when the program is executed in CPU 100, an input unit 106 for receiving a user operation with a keyboard, a mouse or the like, a display device 108 displaying information on a screen, a network I/F (interface) 110 for connection to network 30, and an HDD (Hard Disk Drive) 112 as a memory device.

The construction shown in FIG. 2 is that of a general computer.

Figure 3:
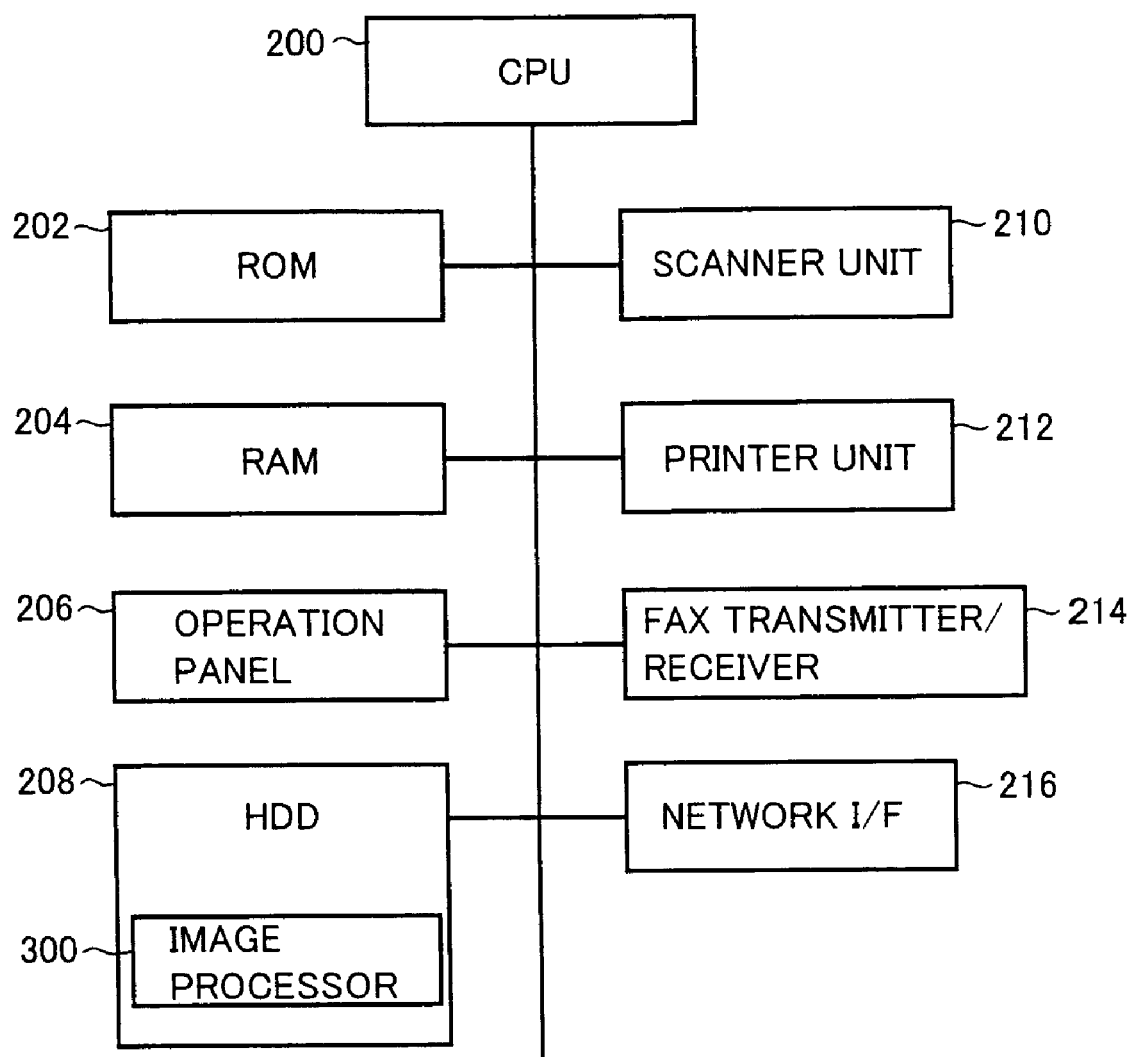
FIG. 3 shows a specific example of a hardware construction of an MFP 20.

Referring to FIG. 3, MFP 20 includes a CPU 200 for executing a program to control a whole of MFP 20. CPU 200 is connected to an ROM 202, an RAM 204, an operation panel 206 for displaying information and receiving a user operation, an HDD 208 as a memory device, and a network I/F 216. CPU 200 is further connected to a scanner unit 210 for reading a document image as an original, a printer unit 212 for printing image data on paper, and a facsimile transmitter/receiver 214 for performing facsimile transmission and reception of the image data. HDD 208 also includes an image processor 300 having a function formed with CPU 200 reading and executing a program stored in ROM 202 or the like.

Figure 4:
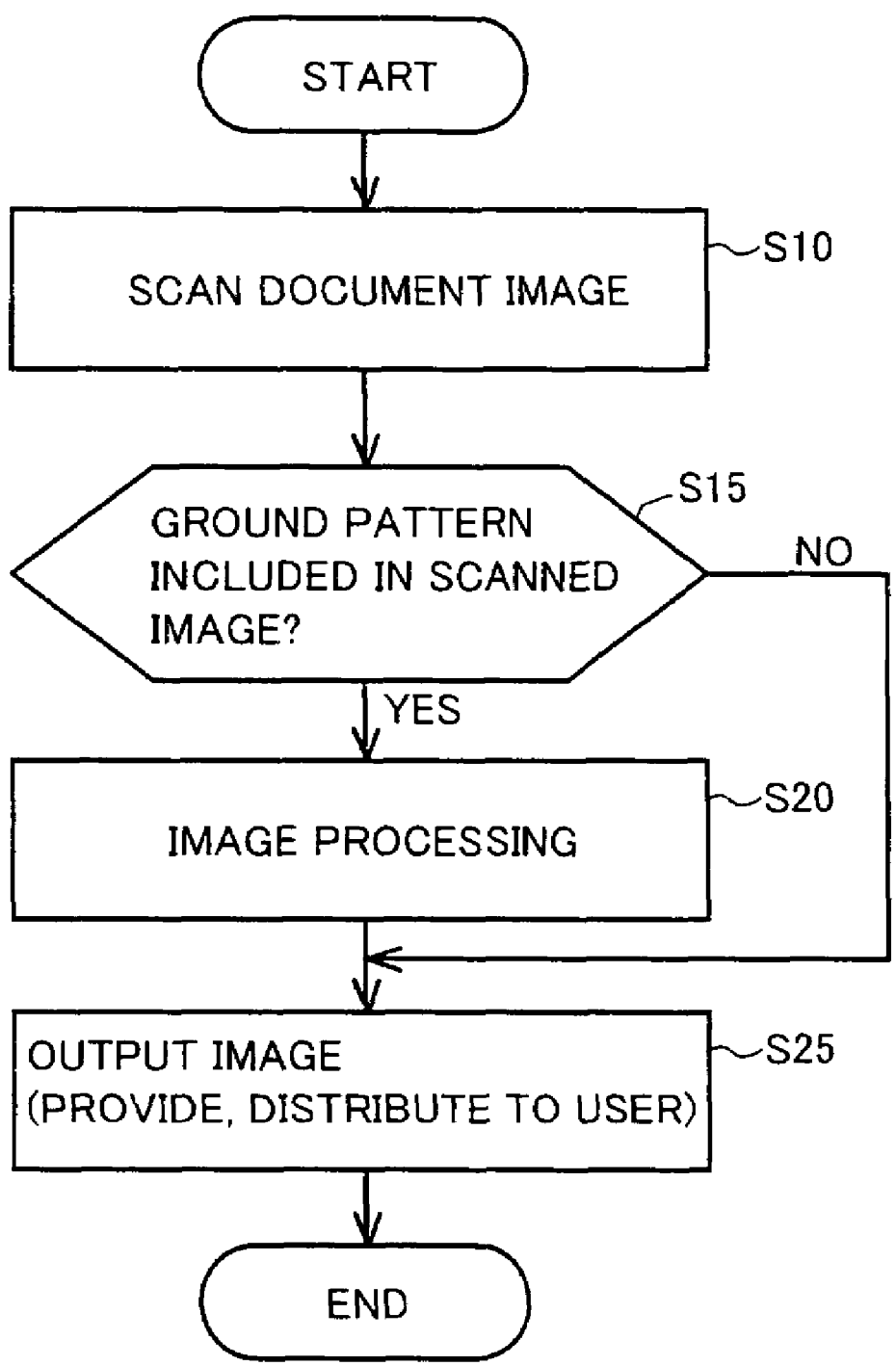
FIG. 4 is a flow chart of image processing executed for scanning and printing an original in MFP 20 according to this embodiment.

Processing shown in a flow chart of FIG. 4 is performed by CPU 200 of FIG. 3 reading and executing a program stored in ROM 202 or the like.

Referring to FIG. 4, in MFP 20 according to this embodiment, a scan instruction is received at network I/F 216 from information processing terminal 10 via a scanner driver, and is input to scanner unit 210. In scanner unit 210, a document image as an original is scanned according to the instruction (step S10), and image processor 300 detects as to whether a ground pattern is included in a scanned image or not (step S15).

When the ground pattern is detected from the scanned image in step S15 (YES in step S15), image processing is performed in image processor 300 to prevent the ground pattern from being removed in subsequent processing (step S20). When the ground pattern is not detected from the scanned image in step S15 (NO in step S15), processing of step S20 is skipped. Then, the image is output from printer unit 212, facsimile transmitter/receiver 214, network I/F 216, or the like (step S25).

First Embodiment

Figure 5:
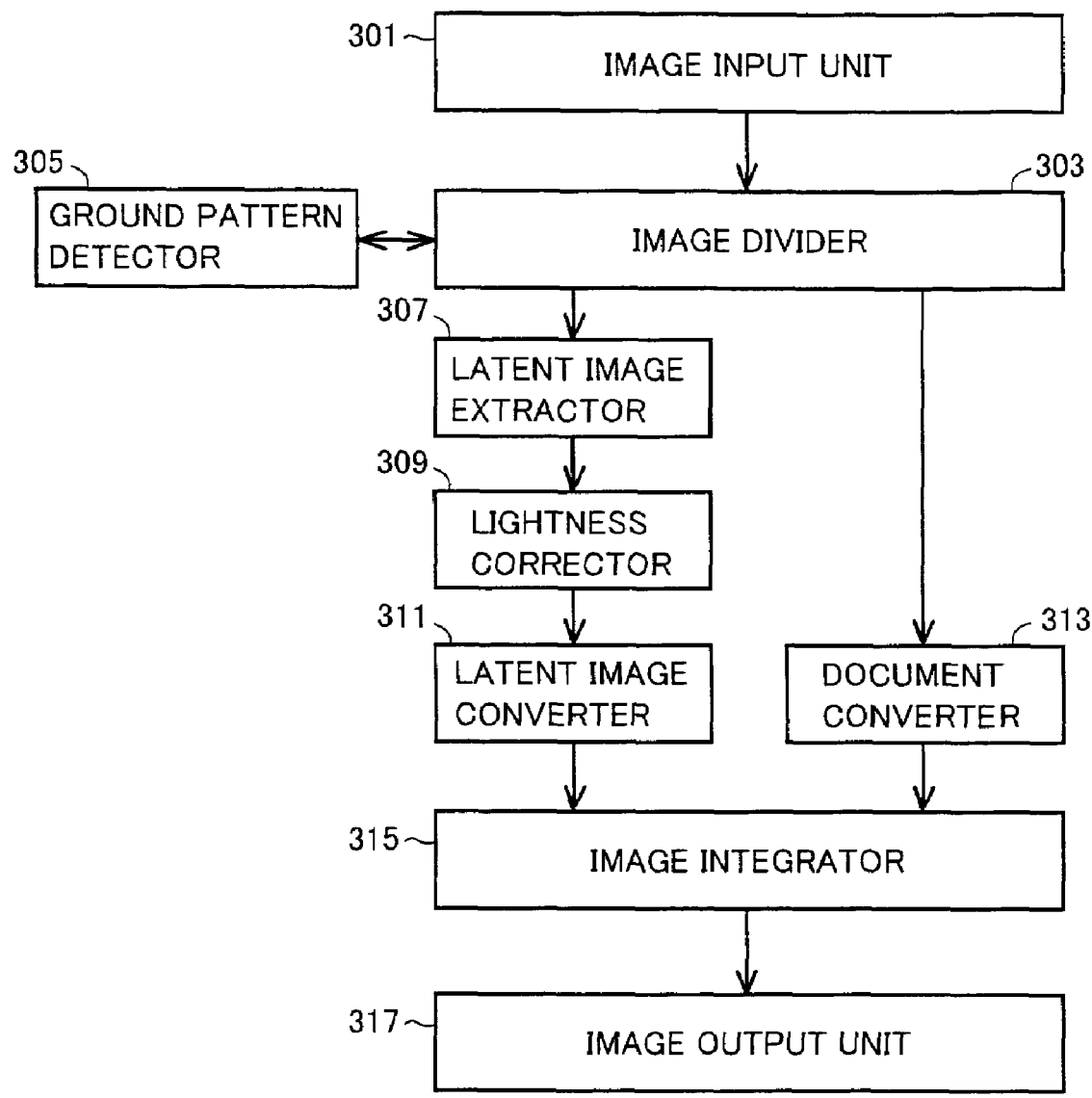
FIG. 5 shows a specific example of a functional construction of an image processor 300 according to a first embodiment.

FIG. 5 shows a specific example of a functional construction of image processor 300 according to a first embodiment for performing the processing described above. A function shown in FIG. 5 is implemented by CPU 200 of FIG. 3 reading and executing a program stored in a memory device such as ROM 202.

Referring to FIG. 5, image processor 300 according to the first embodiment includes an image input unit 301 for inputting image data read in scanner unit 210 to image processor 300, an image divider 303 for dividing the image data input with image input unit 301 into a ground portion and the other portion by performing binarization or division processing using a threshold value, a ground pattern detector 305 for detecting a ground pattern from the ground portion separated, a latent image extractor 307 for extracting a latent image from the ground pattern detected, a lightness corrector 309 for correcting lightness of the latent image extracted, a latent image converter 311 for converting a color of a latent image region by replacing the latent image region obtained by binarization of a ground image including the latent image having corrected lightness with another image, a document converter 313 for converting a color of a document region by replacing the document region, which is a portion other than the separated ground portion, with another image, an image integrator 315 for integrating both of converted images, and an image output unit 317 for outputting a processed image from image processor 300.

Figure 6:
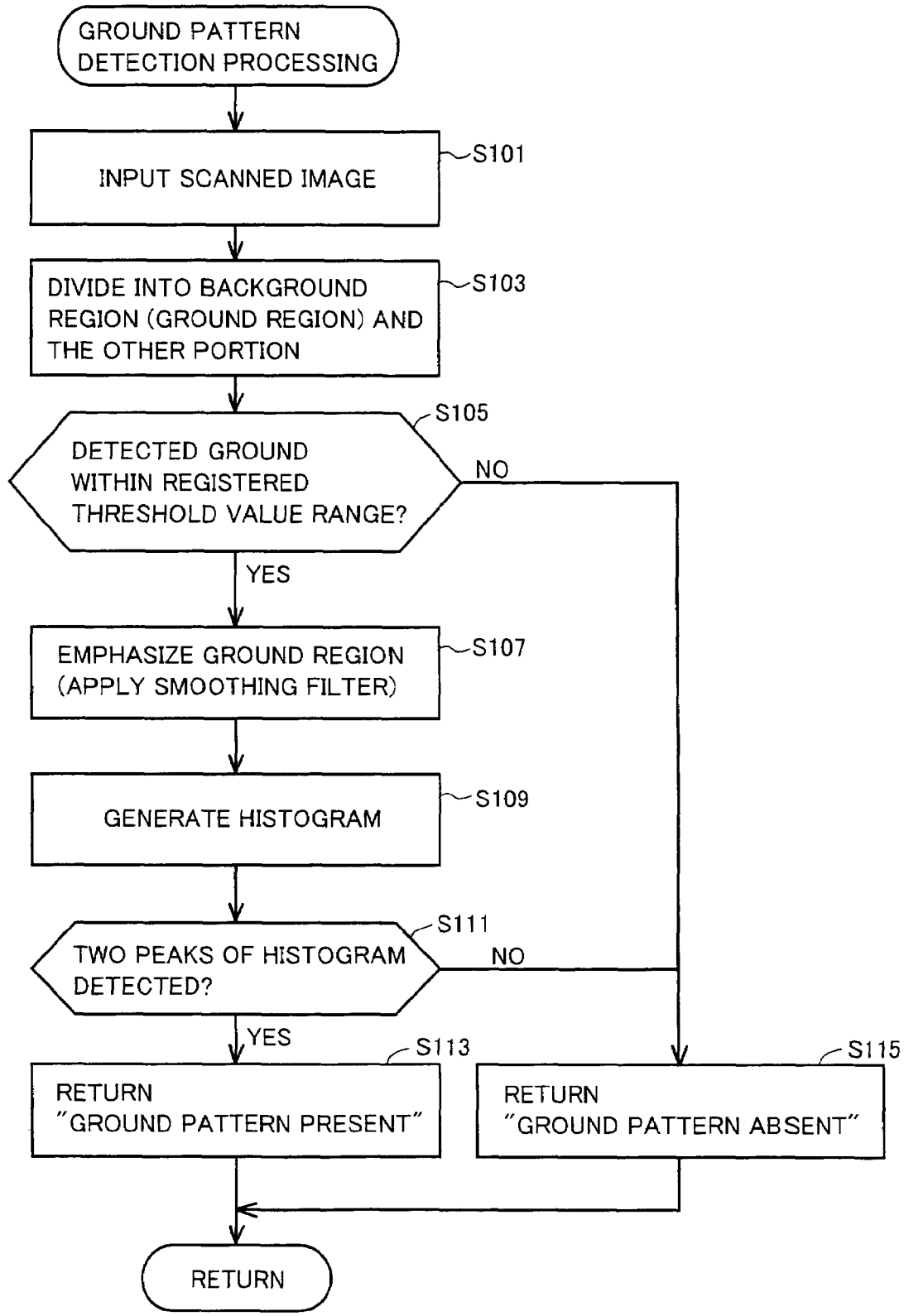
FIG. 6 is a flow chart of ground pattern detection processing in step S15 which is executed in image processor 300 according to the first embodiment.

Referring to FIG. 6, image data obtained by scanning in step S10 described above is input with image input unit 301 to image processor 300 (step S101), and is passed to image divider 303.

In image divider 303, the image data input from image input unit 301 is divided into a background region which is a ground portion and a portion other than the ground portion (step S103), and the ground portion is input to ground pattern detector 305.

Thereafter, in ground pattern detector 305, an average value (an RGB value) of a ground region image input from image divider 303 is calculated, and the RGB value calculated is converted into an Lab value or an Luv value, a color value independent of a device. Then, the Lab value or Luv value obtained is compared with an Lab value or an Luv value of ground registered data which is a threshold value as a reference value to determine whether a ground pattern may be included in the ground portion (step S105).

As a result of comparing in step S105, when the ground portion input from image divider 303 is not in a range of the threshold value, that is, not in a range indicating a possibility of existence of the ground pattern in the ground portion (NO in step S105), it is determined that the ground portion input from image divider 303 does not correspond to the ground registered data, and "ground pattern absent" is returned in ground pattern detector 305 as a detection result (step S115), As a result of comparing in step S105, when the ground portion input from image divider 303 is in the range of the threshold value, that is, in the range indicating a possibility of existence of the ground pattern in the ground portion (YES in step S105), it is determined that the ground portion input from image divider 303 corresponds to the ground registered data, and smoothing using a smoothing filter is performed in ground pattern detector 305 to emphasize a contrast of the ground region (step S107).

When the ground portion includes a ground pattern of a combination of a pattern 1 (a "ground" portion) formed with lines of a high screen ruling and a pattern 2 (a "pattern" portion) formed with dots of a low screen ruling (FIG. 7A), the smoothing filter used in step S107 has a size larger than a width of a line forming pattern 1 and smaller than a size of a dot forming pattern 2 so as to blur the fine pattern 1 and leave the large pattern 2, and thereby a tone difference can be generated between pattern 1 and pattern 2 in step S107 (FIG. 7B).

Figure 36A:
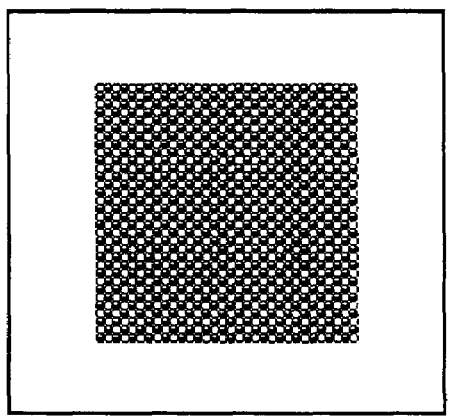
FIGS. 36A and 36B show an example of a ground pattern contemplated in the present invention.
Figure 36B:
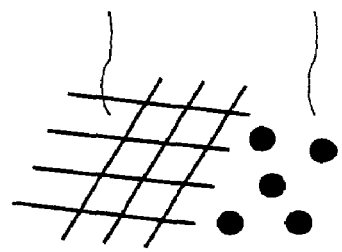

It is to be noted that, though the smoothing is performed in the specific example described above for the ground pattern contemplated in the present invention (FIG. 36) which is a combination of pattern 1 (the "ground" portion) formed with lines of a high screen ruling and pattern 2 (the "pattern" portion) formed with dots of a low screen ruling, a construction of the ground pattern is not limited to that described above, and it may be, for example, a combination of dots having different sizes as shown in FIG. 8A, that is, a combination of a pattern 1 (a "ground" portion) formed with dots of a high screen ruling and a pattern 2 (a "pattern" portion) formed with dots of a low screen ruling. In this situation, a tone difference can also be generated between pattern 1 and pattern 2 in step S107 (FIG. 8B) by using a smoothing filter having a size larger than a size of a dot forming pattern 1 and smaller than a size of a dot forming pattern 2.

Thereafter, a histogram of the ground region smoothed in step S107 is generated in ground pattern detector 305 (step S109). When two peaks respectively indicating pattern 1 and pattern 2 described above are detected from the histogram generated in step S109 (YES in step S111), "ground pattern present" is returned as the detection result in ground pattern detector 305 (step S113). On the other hand, when the two peaks are not detected (NO in step S111), "ground pattern absent" is returned as the detection result in ground pattern detector 305 (step S115).

In step S111, if pixels of at least a certain percentage (for example, at least 15%) of a whole ground portion besides a first peak have values of at least a prescribed value, the pixels may be regarded as a second peak to make the detection result "ground pattern present".

It is to be noted that, the detection result may be obtained in step S111 with a method other than that described above. As an example, pattern matching may be adopted to determine presence or absence of a pattern forming a ground pattern to obtain the detection result.

Figure 9:
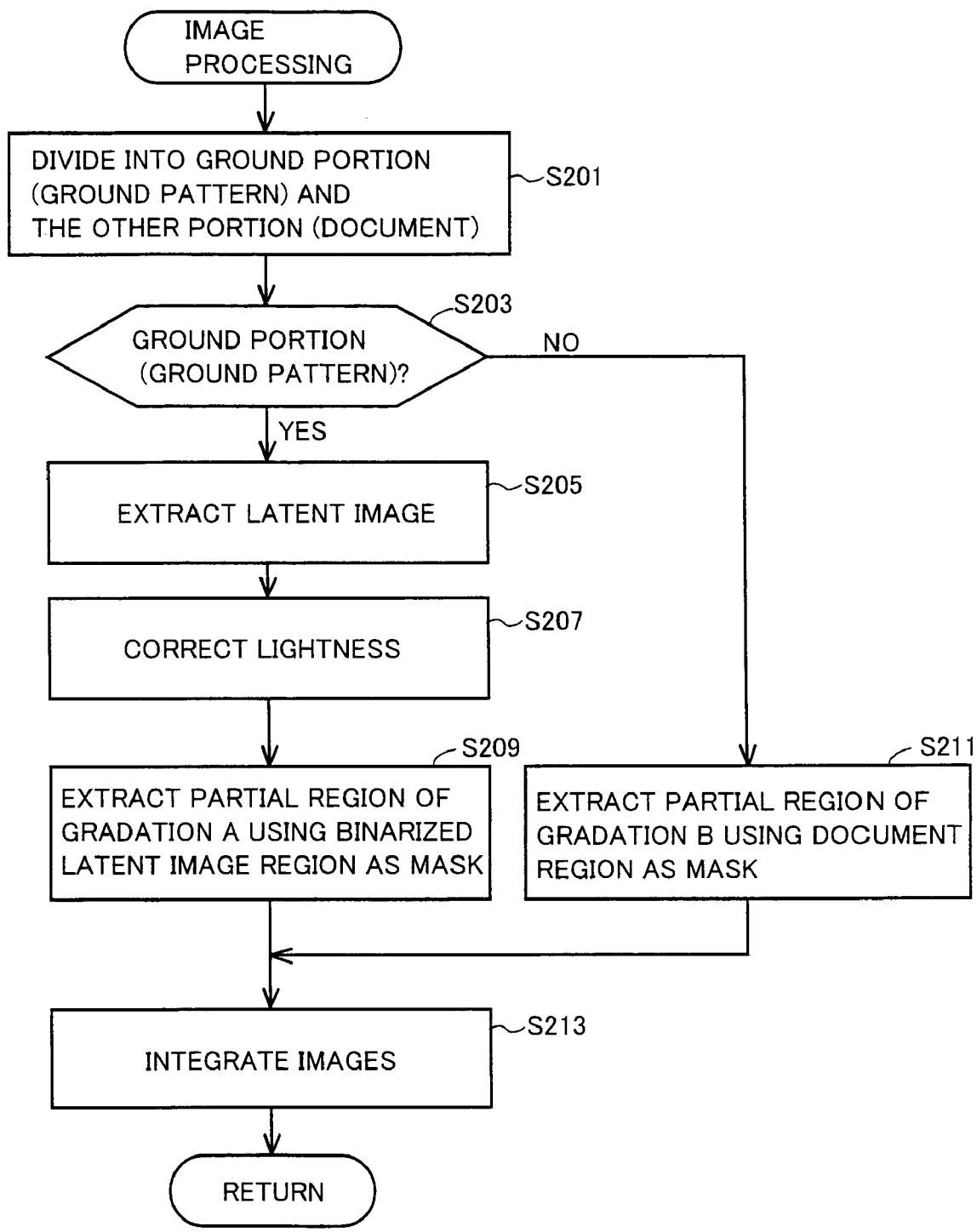
FIG. 9 is a flow chart of image processing in step S20.

When the result of the aforementioned ground pattern detection processing is "ground pattern present" (YES in step S15), referring to FIG. 9, the image data input from image input unit 301 is divided into the ground portion including the ground pattern and the other portion in image divider 303 (step S201), and the ground portion is input to latent image extractor 307 while the other portion, which is the document image, is input to document converter 313. Since division processing in step S201 is similar to that in step S103, a result of processing in step S103 may be used here.

Figure 37A:
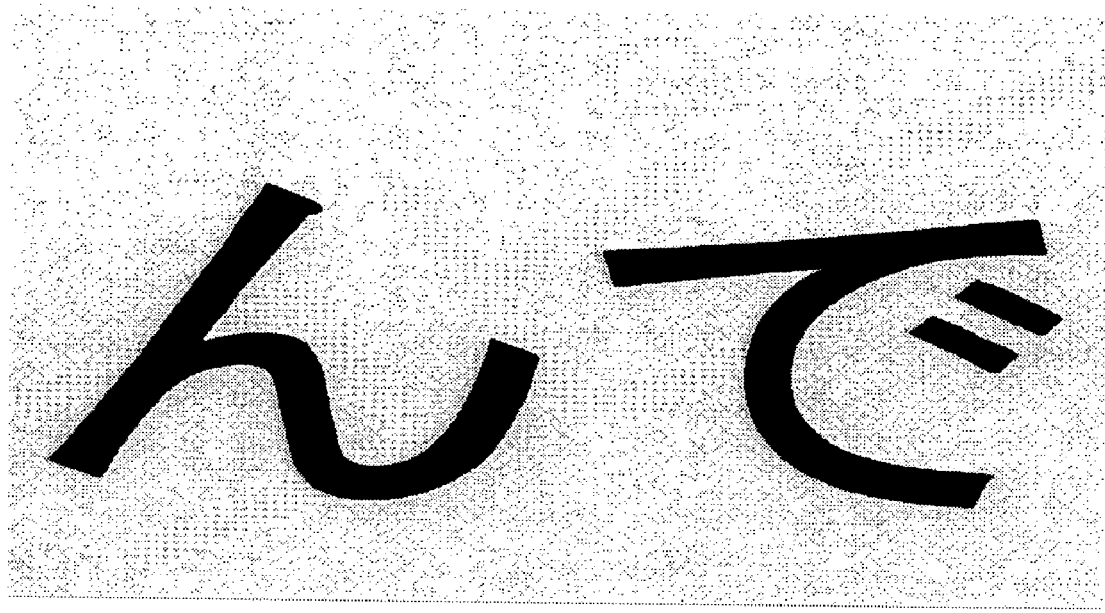
FIGS. 37A and 37B show a specific example of a document image having a ground pattern.
Figure 37B:
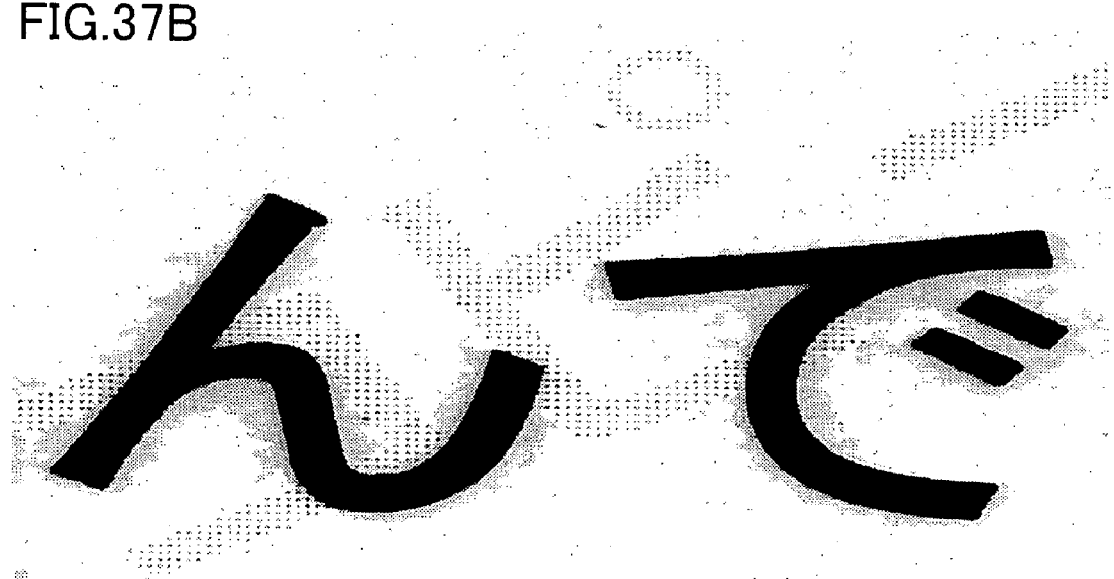
Figure 38:
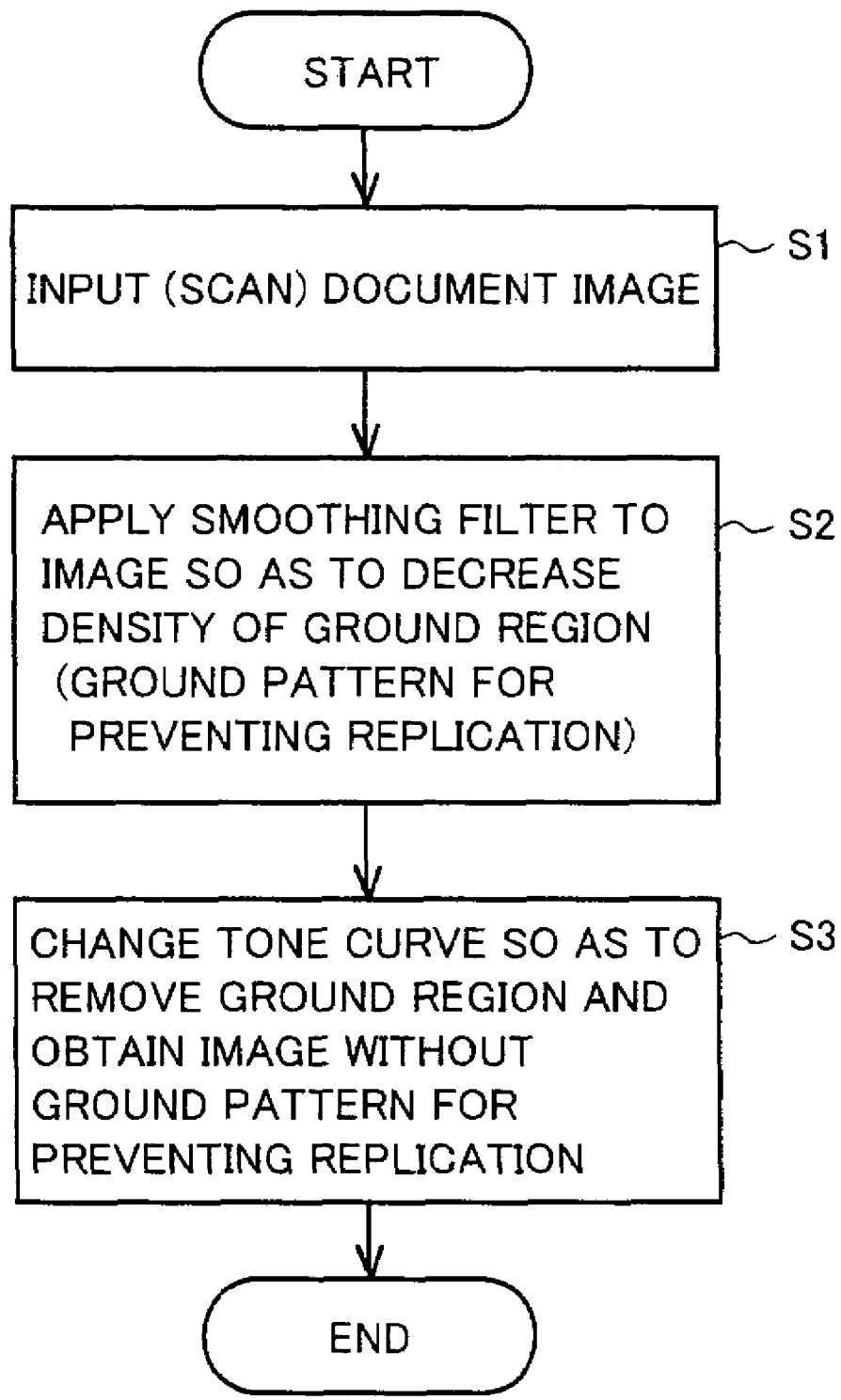
FIG. 38 is a flow chart of a specific example of processing executed in a conventional image processing apparatus to erase a ground pattern.
Figure 39A:
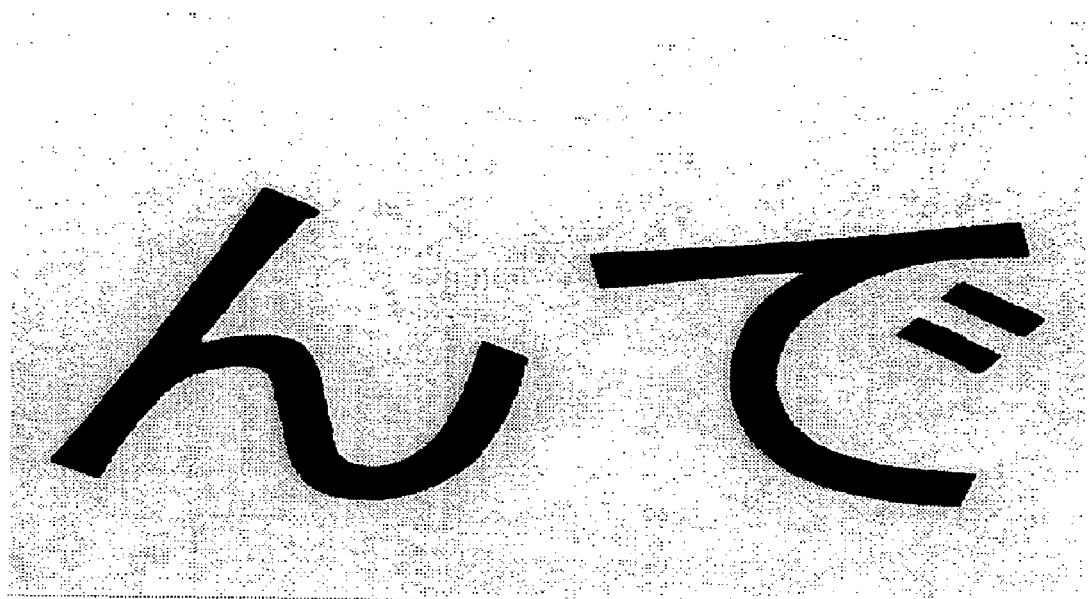
FIGS. 39A and 39B show specific examples of images obtained in steps S2 and S3.
Figure 39B:

In latent image extractor 307, a latent image is extracted from the ground portion input from image divider 303 (YES in step S203, S205), and is input to lightness corrector 309. As described with FIG. 37, the latent image is an image which appears when the document image including the ground pattern is copied. When the ground pattern is formed with the combination of pattern 1 (the "ground" portion) formed with lines of a high screen ruling and pattern 2 (the "pattern" portion) formed with dots of a low screen ruling, the latent image corresponds to a region indicated with pattern 2.

Since the latent image is usually an aggregate of dots (forming pattern 2), the latent image is extracted in step S205 by enlarging each dot until a distance between dots becomes zero. The latent image is also extracted by performing a pattern search to extract a region including arranged dots and masking the region.

Thereafter, in lightness corrector 309, lightness of a latent image region image input from latent image extractor 307 is corrected (step S207), and the result is input to latent image converter 311. In step S207, lightness of the latent image region image is corrected in lightness corrector 309 so as to make a peak of a lightness histogram of the latent image region image closer to a peak of a lightness histogram of the document image separated in step S201. That is, when the document image of a general document including the ground pattern is input to image processor 300, lightness of the latent image region is corrected so as to become closer to lightness of black characters because most of the document image is formed with black characters.

Thereafter, in latent image converter 311, a partial region of a mask image A (for example, a gradation image A) is extracted using the latent image region of the latent image region image having corrected lightness which is input from lightness corrector 309 as a mask (step S209), and the latent image region image having the partial region replacing the latent image region is input to image integrator 315.

In addition, in document converter 313, a partial region of a mask image B (for example, a gradation image B) is extracted using a document region of the document image other than the ground portion input from image divider 303 directly as a mask (step S211), and a document region image having the partial region replacing the document region is input to image integrator 315.

Gradation images A and B as mask images A and B are previously stored in a memory device such as HDD 208 or another device which can be accessed via network 30. Specific examples of gradation images A and B as well as a relation between gradation images A and B will be described below.

Two images are integrated in image integrator 315, that is, the latent image region image which is the partial region of the mask image input from latent image converter 311 and the document region image which is the partial region of the mask image input from document converter 313 (step S213). In step S213, the two images as partial regions of the mask images are preferably compared with each other in image integrator 315 so as to give to the image having a higher density a higher priority in integration.

Figure 10A:
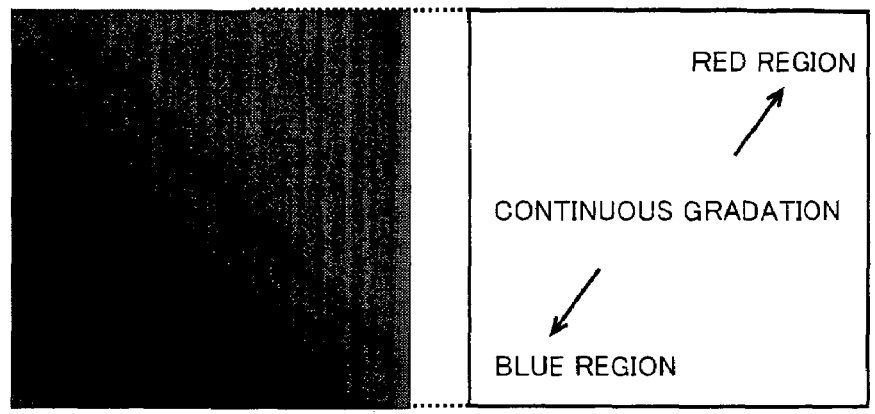
FIGS. 10A and 10B show specific examples of a gradation image A and a gradation image B which are mask images according to the first embodiment.
Figure 10B:
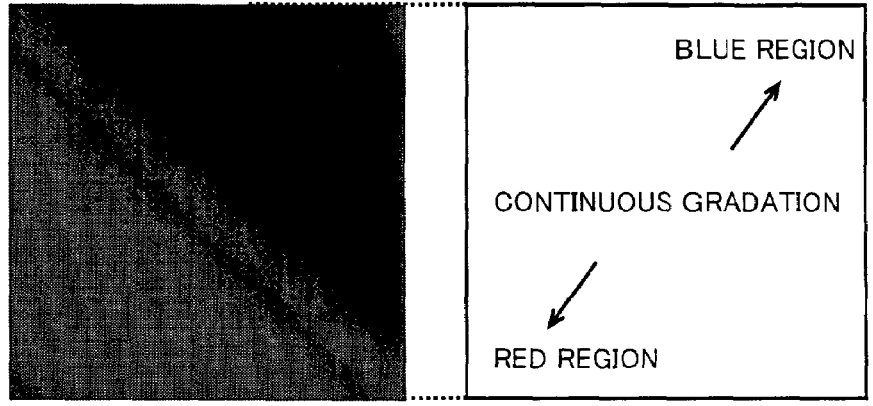

The mask image used in image processor 300 according to this embodiment is an image of a plurality of different colors excluding a background color for outputting (for example, a color of paper for printing in a situation of a print output (which is generally white)), which vary from one to another via a neutral color. The plurality of colors are preferably a combination of colors having high chromas and a large difference in hues with each other. More specifically, a combination of colors (for example, red and blue) having at least a prescribed chroma (for example, red or blue) and a difference in hues of at least a prescribed RGB value (or an Lab value or an Luv value) is preferred. Referring to FIGS. 10A and 10B, the gradation image as the mask image according to this specific example is an image having a red region and a blue region arranged in opposite corners and a region of continuous variation (gradation) of color arranged therebetween.

In addition, a plurality of mask images used in image processor 300 according to this embodiment use the same colors with different arrangement positions for regions of the plurality of colors and different manners of variations (such as directions of variations) so as to have colors different from each other in the same position. Referring to FIGS. 10A and 10B, gradation images A and B according to this specific example have arrangement positions for the red and blue regions and directions of gradation respectively opposite to each other.

It is to be noted that, though the gradation image is used as the mask image in this embodiment, the image used as the mask image in the present invention is not limited to the gradation image as long as it is an image with a plurality of colors varying from one to another via a neutral color. The image may have, for example, colors varying from one color region toward another color region in a stepwise manner with prescribed intervals. In this situation, the prescribed intervals are preferably small. In addition, the image may be like marble in which variations of colors do not follow a direction from one color region toward another color region.

Figure 11:
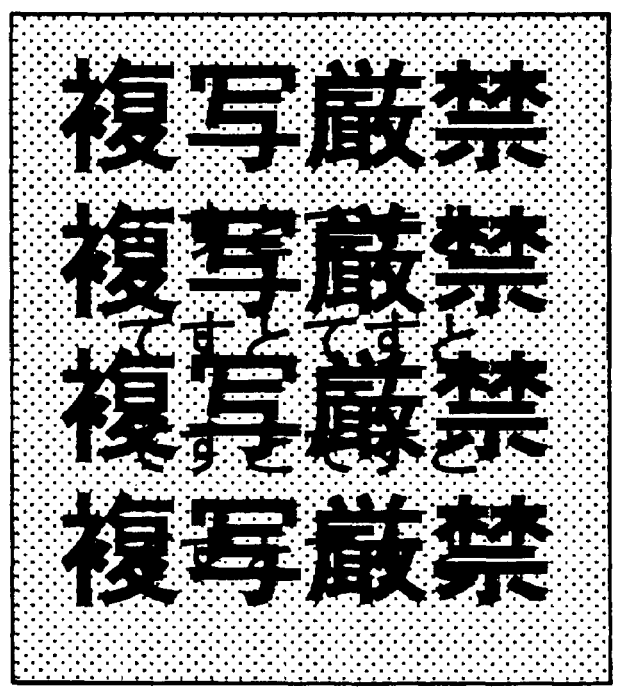
FIG. 11 shows a specific example of a document image having a ground pattern.

When a document image shown in FIG. 11 is scanned in step S10, a ground pattern is detected with image processor 300 in step S115 and image processing is performed in step S20.

Figure 12A:
FIGS. 12A and 12B show a specific example of a document image having a ground pattern which is divided into a ground portion and the other portion.
Figure 12B:
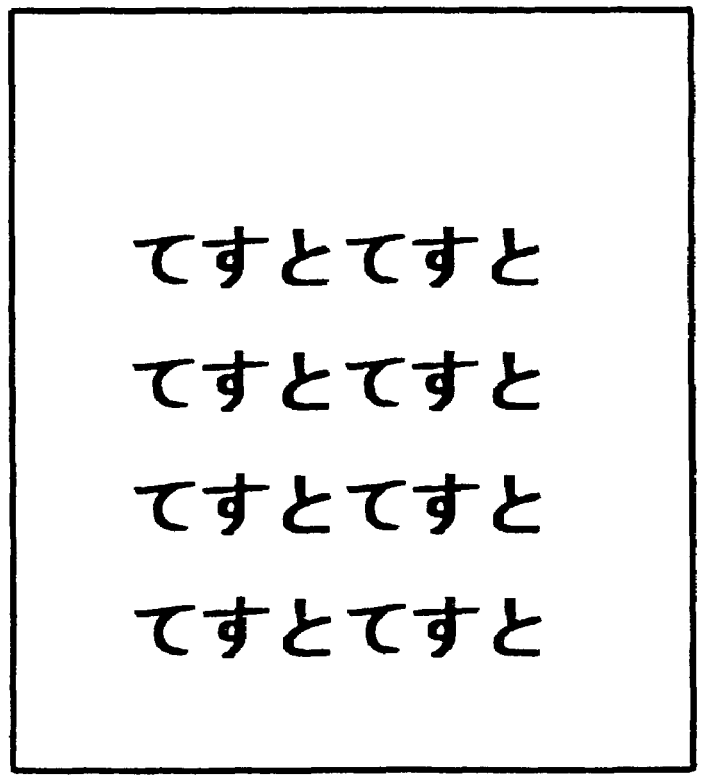

When image processing is performed in step S20 for the document image having the ground pattern shown in FIG. 11, the document image is divided with image divider 303 in step S201 into a ground portion shown in FIG. 12A and a portion other than the ground portion shown in FIG. 12B, which are respectively input to latent image extractor 307 and document converter 313.

It is to be noted that, though a latent image portion of the document image having the ground pattern must be actually concealed, the latent image portion is clearly shown in each of FIGS. 11, 12A and 12B for convenience of explanation.

FIGS. 13A and 13B show a specific example of a document image having a ground pattern after division into a ground portion and the other portion, extraction of a latent image from the ground portion, and correction of lightness of a latent image region image. When the document image is divided into the ground portion shown in FIG. 12A and the portion other than the ground portion shown in FIG. 12B with image divider 303 in step S201, the latent image is extracted from the ground portion of FIG. 12A with latent image extractor 307 in step S205, lightness of the latent image region is then corrected with lightness corrector 309 in step S207 (FIG. 13A) so as to become closer to lightness of black characters forming most of the document image as the portion other than the ground portion shown in FIG. 13B, and the result is input to latent image converter 311.

Figure 14A:
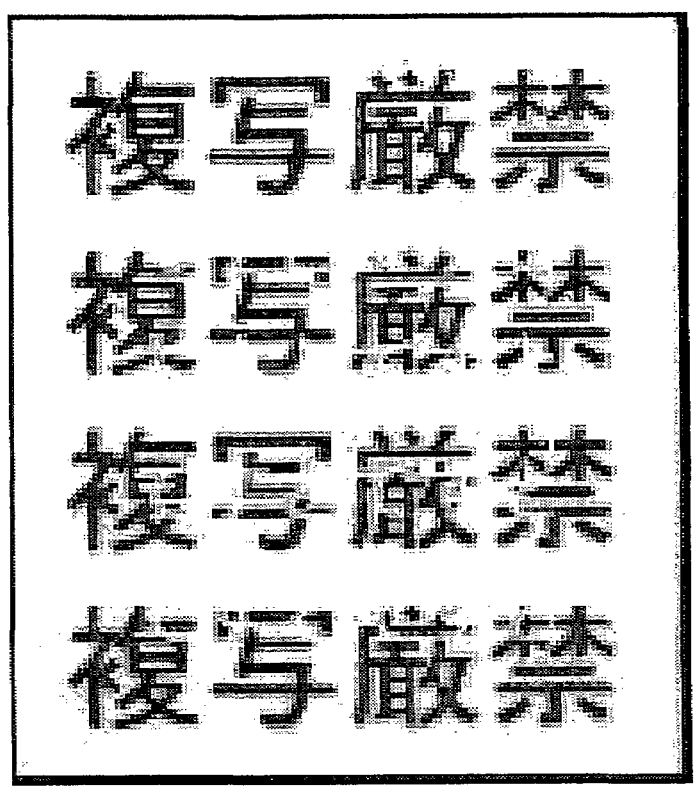
FIGS. 14A and 14B show a specific example of a document image having a ground pattern in which each of a latent image region and a document region is replaced with a gradation image.

When the lightness of the latent image region is corrected in step S207 as shown in FIG. 13A so as to become closer to lightness of the document image shown in FIG. 13B, the latent image region is replaced using gradation image A shown in FIG. 10A by latent image converter 311 in step S209, and the latent image region image having replaced colors, which is a gradation image shown in FIG. 14A, is input to image integrator 315. In addition, the document region is replaced using gradation image B shown in FIG. 10B by document converter 313 in step S211, and the document region image having replaced colors, which is a gradation image shown in FIG. 14B, is input to image integrator 315.

Figure 14B:
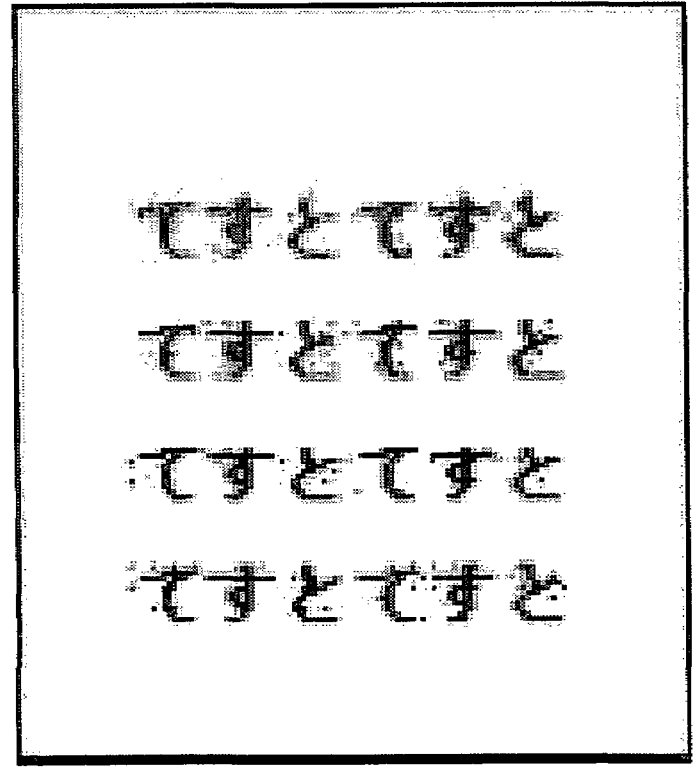
Figure 15:
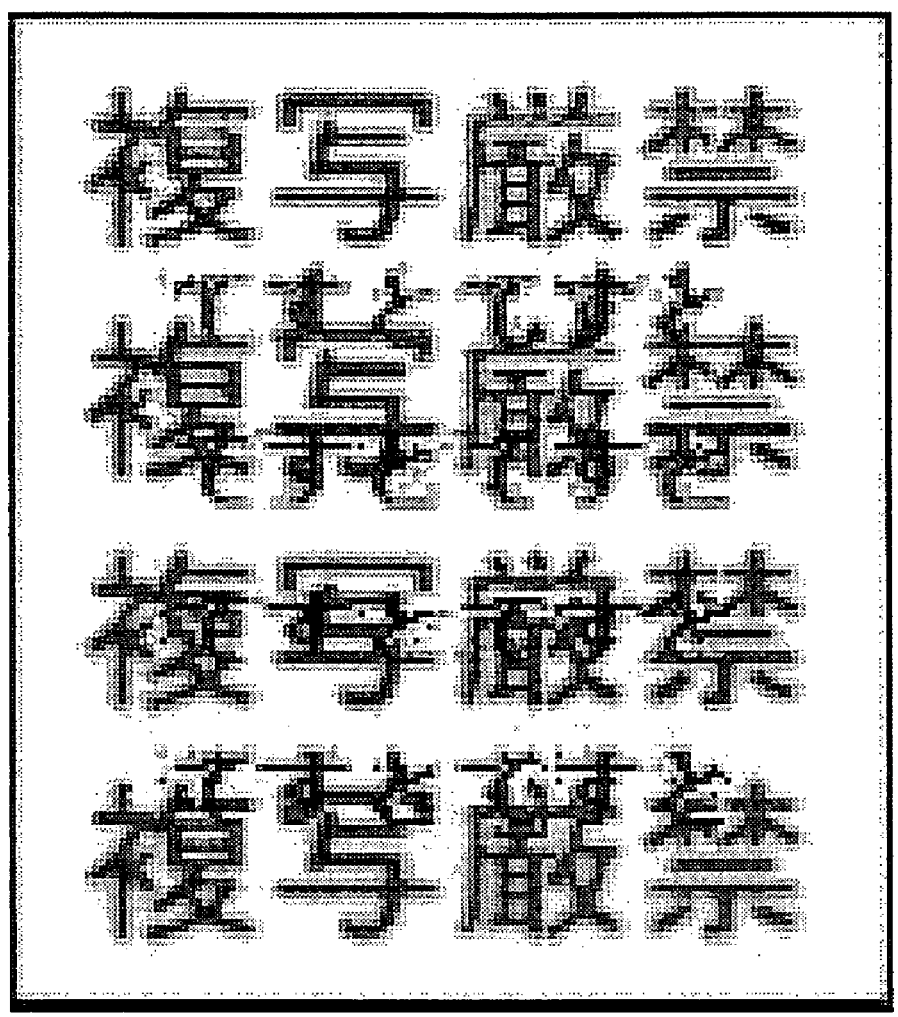
FIG. 15 shows a specific example of an image output from MFP 20 after image processing according to the first embodiment for a document image having a ground pattern.

When the latent image region image as the gradation image shown in FIG. 14A from latent image converter 311 and the document region image as the gradation image shown in FIG. 14B from document converter 313 are input to image integrator 315, these two images are integrated in image integrator 315 in step S213 to obtain an image shown in FIG. 15 which is output in step S25.

As shown in FIGS. 10A and 10B, gradation images A and B used in steps S209 and S211 have arrangement positions for the red and blue regions and directions of gradation opposite to each other, and thus colors of the same position of these two gradation images are different from each other. Therefore, a partial region of gradation image A for replacement using the latent image region as a mask and a partial region of gradation image B for replacement using the document region as a mask have different colors on the same position of respective gradation images and, as shown in FIG. 15, both images can be recognized with the different colors even when the images are superposed by integration.

That is, by performing the image processing described above during scanning and printing of an original in the image processing apparatus according to this embodiment, a latent image included in a ground pattern is emphasized if the original is a document image having the ground pattern, and a highly readable image with different colors is output while high security with the ground pattern is maintained.

In addition, since colors of the latent image region image included in the document image having the ground pattern and the document region image are converted in the image processing by replacement with partial regions of a plurality of mask images having the same colors, one of the latent image region image and the document region image cannot be deleted by image processing to delete a specific color for the image scanned and printed in the image processing apparatus according to this embodiment, which can increase security with the ground pattern.

Since high security with the ground pattern can be maintained while a scan is allowed and a highly readable image can be provided with the image processing apparatus according to the present invention, it can be used for a wider use as compared with an image processing apparatus which prohibits a scan itself. In addition, the present invention is suitable for distribution of a document image not allowing improper replication since the security with the ground pattern of the image provided is not easily degraded with normal image processing.

Second Embodiment

In the image processing described above, a difference in hues of mask images sometimes becomes small for the same position of the mask images, depending on a method of applying the plurality of mask images (gradation images A and B). More specifically, gradation images A and B as mask images shown in FIGS. 10A and 10B have small difference in hues in middle portions thereof.

When such gradation images A and B are used in MFP 20 according to the first embodiment to perform the image processing and the latent image region image and the document region image are respectively replaced with partial regions having small difference in hues of the gradation images, readability is decreased if a distance between elements of the latent image and the document region is small or if the elements are superposed. Therefore, MFP 20 according to a second embodiment has a construction and an operation as described in the following.

Figure 16:
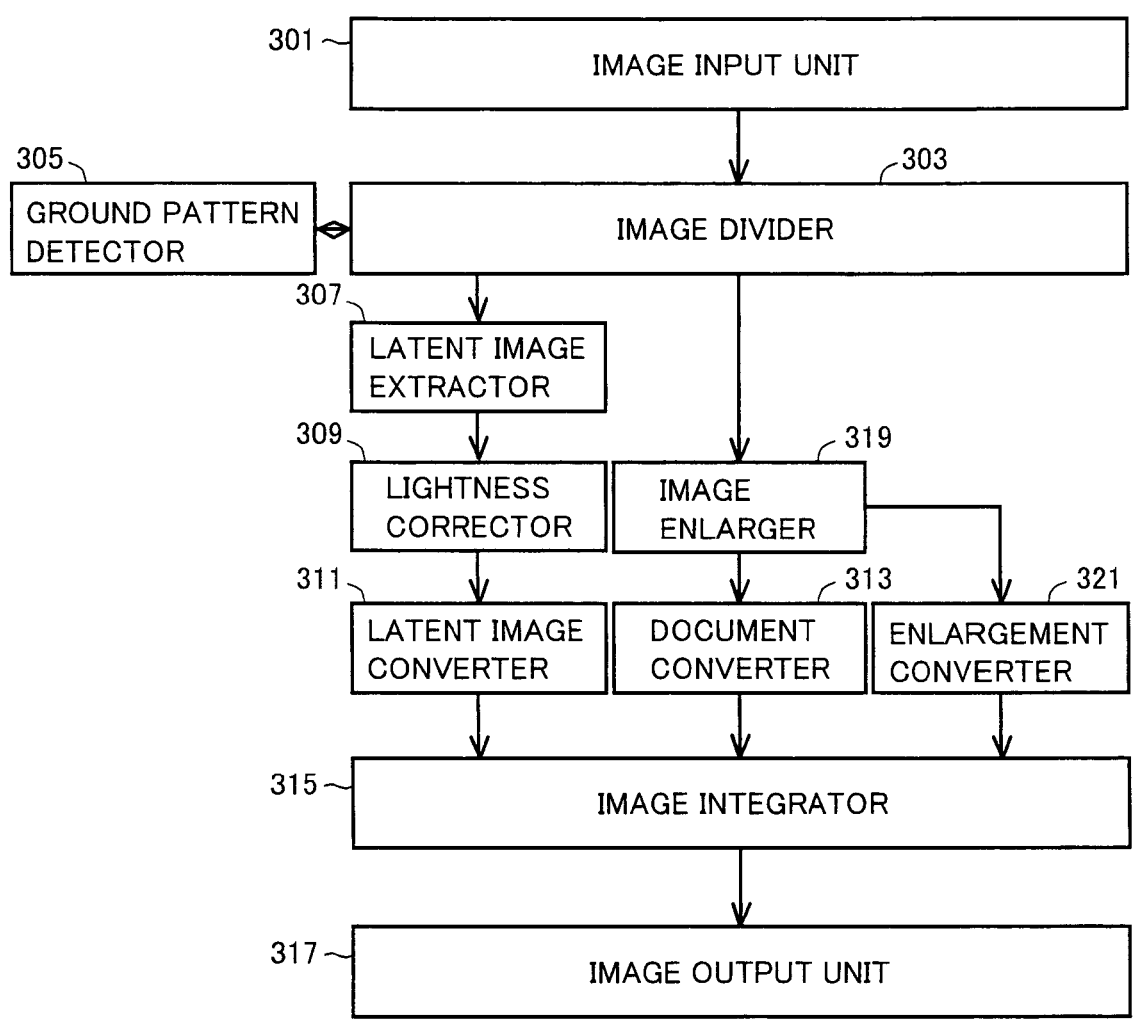
FIG. 16 shows a specific example of a functional construction of an image processor 300 according to a second embodiment.

FIG. 16 shows a specific example of a functional construction of image processor 300 according to the second embodiment for performing the image processing described above during scanning and printing of an original in MFP 20. A function shown in FIG. 16 is also implemented by CPU 200 of FIG. 3 reading and executing a program stored in a memory device such as ROM 202.

Referring to FIG. 16, image processor 300 according to the second embodiment includes, in addition to each portion of MFP 20 according to the first embodiment, an image enlarger 319 for enlarging an image which is an element included in the document region, the portion other than the ground portion, separated in image divider 303, and an enlargement converter 321 for converting a region of a portion enlarged with image enlarger 319 by replacement with another image.

Figure 17:
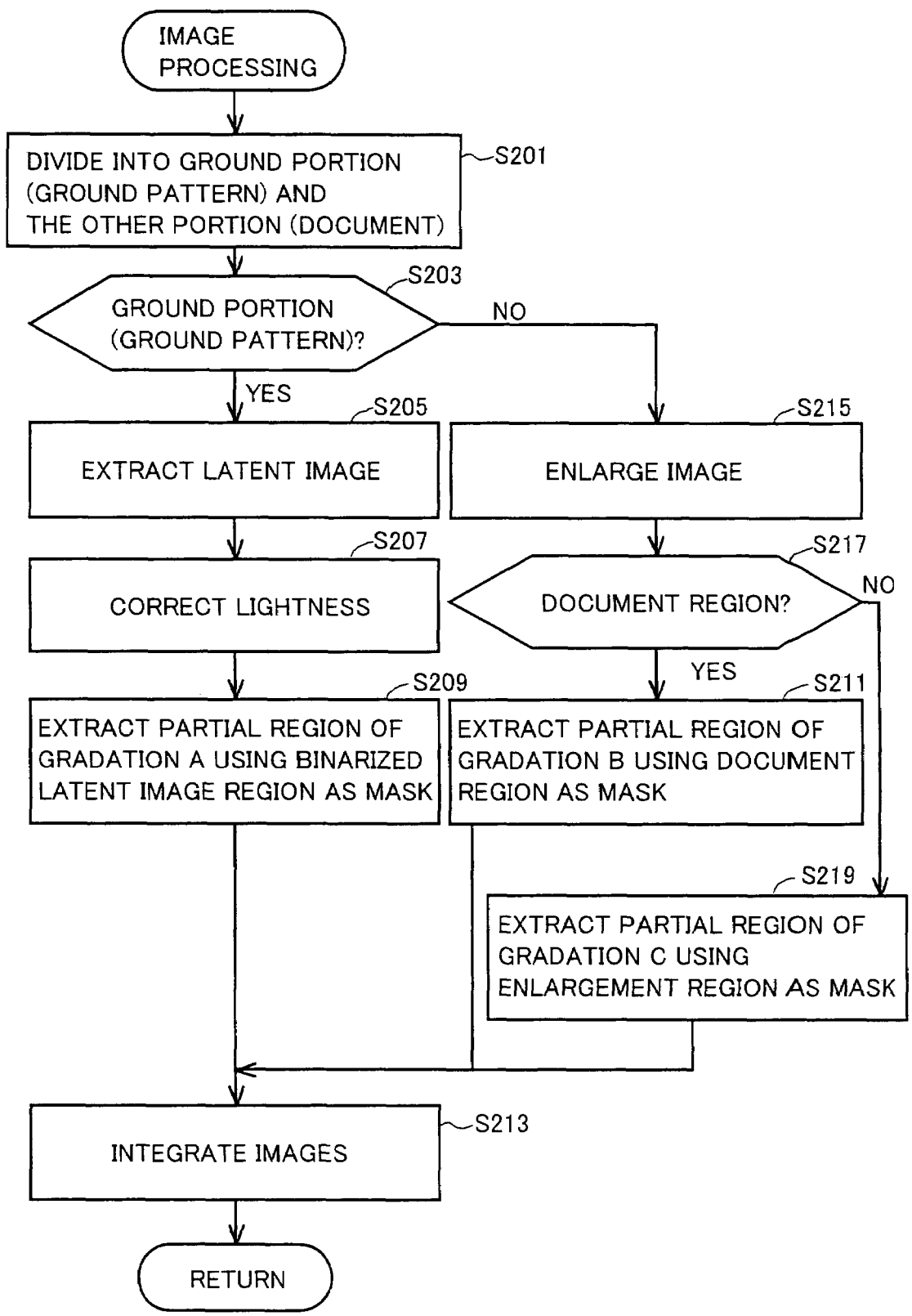
FIG. 17 is a flow chart of image processing in step S20.

FIG. 17 is a flow chart of image processing in step S20 which is performed in image processor 300 according to the second embodiment.

Referring to FIG. 17, processing similar to step S201 of the image processing according to the first embodiment is performed to divide image data input from image input unit 301 into a ground portion including a ground pattern and a portion other than the ground portion in image divider 303 (step S201), and the ground portion is input to latent image extractor 307 while the portion other than the ground portion which is a document image is input to image enlarger 319.

For the ground portion separated in step S201, processing of steps S205-S209 is performed and the latent image region image having a partial region of mask image A (for example, gradation image A) replacing the latent image region is input to image integrator 315.

In image enlarger 319, a number of pixels in the document region, formed with characters and the like, in the document image other than the ground portion input from image divider 303 is increased by a prescribed number to enlarge the document region (corresponding to an outline of the document region) (step S215), and the document region is input to document converter 313 while an enlargement region of the document region is input to enlargement converter 321. In step S215, the number of pixels of a character region may be increased in a certain direction (for example, in a lateral direction) by a prescribed number (that is, a width of the character may be increased), or the number of pixels of the character region may be increased in all directions by a prescribed number (that is, a thickness of the character may be increased).

For the document image input from image enlarger 319 to document converter 313 (YES in S217), processing of step S211 is performed and the document region image having a partial region of mask image B (for example, gradation image B) replacing the document region is input to image integrator 315.

The enlargement region input from image enlarger 319 to enlargement converter 321 (NO in S217) is used as a mask in enlargement converter 321 to extract a partial region of a mask image C (for example, a gradation image C) similarly as in step S211 (step S219), and an enlargement region image having the partial region replacing the enlargement region is input to image integrator 315.

Gradation image C as a mask image according to the second embodiment is also previously stored in a memory device such as HDD 208. A specific example of gradation image C as well as relations of gradation images A, B and C will be described below.

Three images are integrated in image integrator 315, that is, the latent image region image which is the partial region of the mask image input from latent image converter 311, the document region image which is the partial region of the mask image input from document converter 313, and the enlargement region image which is the partial region of the mask image input from enlargement converter 321 (step S213). In step S213 according to this embodiment, it is preferred that the two images, that is, the latent image region image which is the partial region of the mask image input from latent image converter 311 and the document region image which is the partial region of the mask image input from document converter 313 be first integrated, and then the enlargement region image which is the partial region of the mask image input from enlargement converter 321 be overwritten.

Figure 18:
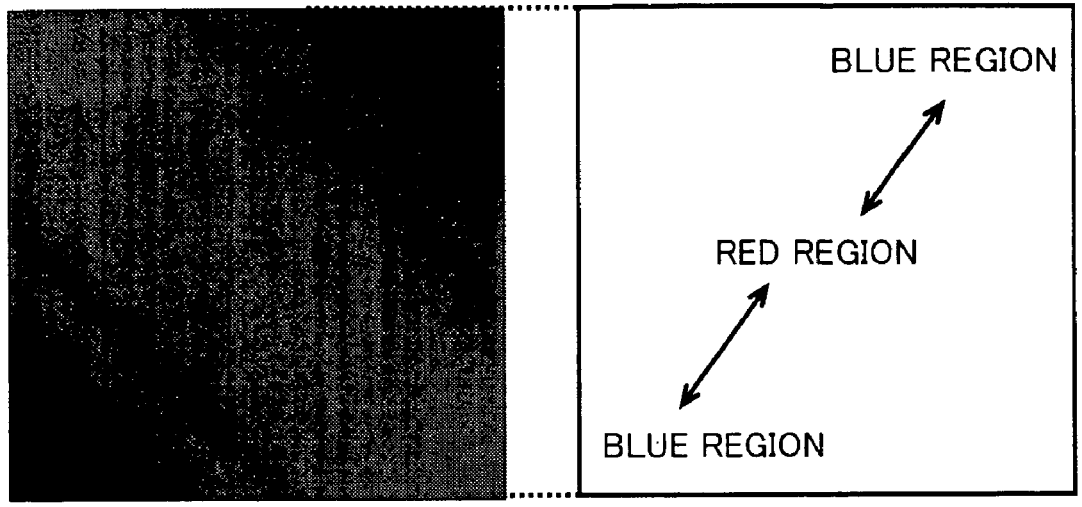
FIG. 18 shows a specific example of a gradation image C which is a mask image according to the second embodiment.

Gradation image C, a specific example of which is shown in FIG. 18, is used in the second embodiment in addition to gradation images A and B which are mask images shown in FIG. 10.

Gradation image C is, similarly as the mask image used in image processor 300 according to the first embodiment, an image of a plurality of different colors excluding a color of paper for printing (which is generally white), which vary from one to another via a neutral color. The gradation images use the same colors with different arrangement positions for regions of the plurality of colors and different manners of variations (such as directions of variations) of colors so as to have colors different from each other in the same position.

Referring to FIG. 18, in gradation image C according to this specific example, the red and blue regions of gradation image A (FIG. 10A) used to convert the latent image region are arranged in positions shifted in a direction of variation of colors.

FIGS. 19-24 show specific examples of images obtained in respective steps described above when the image processing according to this embodiment is performed for a document image having a ground pattern.

Figure 19:
FIG. 19 shows a specific example of an image obtained in step S207.

FIG. 19 shows a specific example of a latent image extracted from a ground portion including the ground pattern in step S205 and having lightness corrected in step S207. The latent image is replaced with gradation image A (FIG. 10A) in step S209 to have colors converted as shown in FIG. 20.

Figures 20, 21:
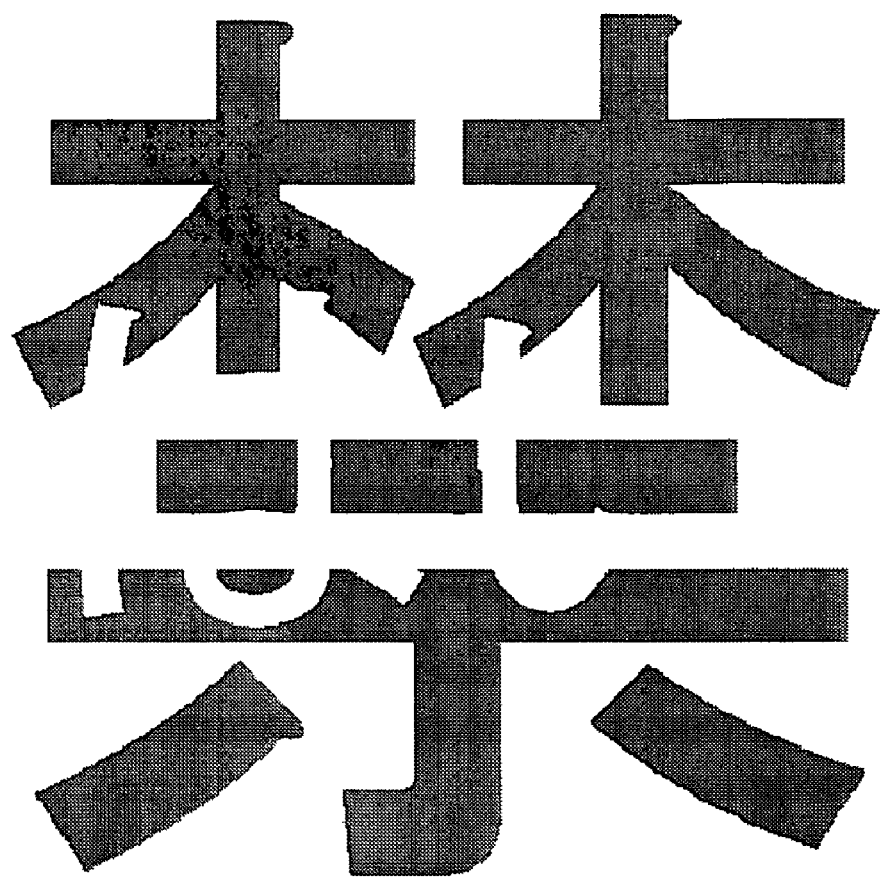
FIG. 20 shows a specific example of an image obtained in step S209.
FIG. 21 shows a specific example of an image obtained by division in step S201.

In addition, FIG. 21 shows a specific example of a document region included in a document image other than the ground portion, which is separated in step S203. The document region is replaced with gradation image B (FIG. 10B) in step S211 to have colors converted as shown in FIG. 22.

Furthermore, FIG. 23 shows a specific example of a document region enlarged in step S215. In step S219, an enlargement region corresponding to an outline of the document region is replaced with gradation image C (FIG. 18) to have colors converted as shown in FIG. 24.

FIG. 25 is a diagram for describing images output from MFP 20 after the image processing according to this embodiment for the document image including the ground pattern.

Figure 25A:
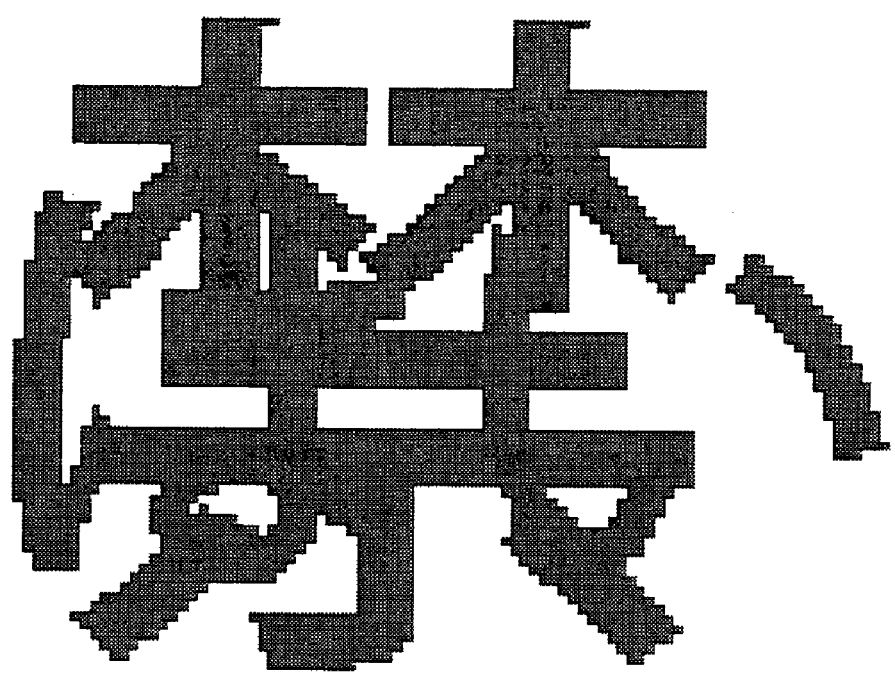
FIGS. 25A and 25B are diagrams for describing images output from MFP 20 after image processing according to the second embodiment for a document image having a ground pattern.
Figure 25B:
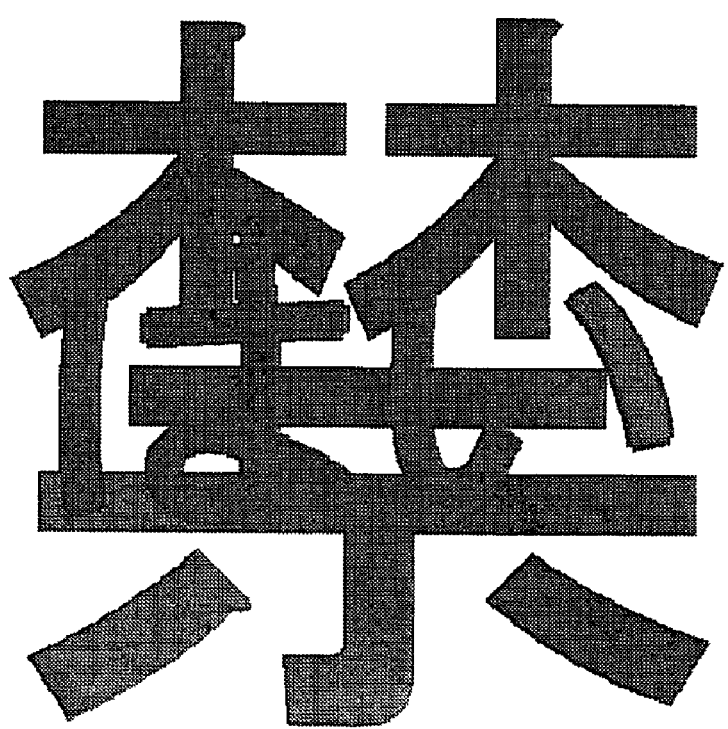

By superposing the images (FIGS. 20, 22, 24) in step S213, the image as shown in FIG. 25B is obtained, which includes different colors for an element of the latent image, an element of the document region, and a border portion of the elements of the latent image and document region (the outline of the document region), and is output in step S25.

As shown in FIGS. 10 and 18, gradation images A-C have arrangement positions for the red and blue regions and directions of gradation respectively different from each other, and thus colors of the same position of the three gradation images are different from each other. When the image processing according to the first embodiment is performed using only gradation images A and B, images shown in FIGS. 20 and 22 are superposed. In this situation, as shown in FIG. 25A, a difference in hues of the elements of the latent image and document region becomes small in positions corresponding to central portions of gradation images A and B in which the elements of the latent image and document region having converted colors are superposed or adjacent to each other, and therefore readability of characters is decreased if the element of the document region is characters. In contrast, the border of the elements of the latent image and document region can be recognized as shown in FIG. 25B when the enlargement region corresponding to the outline of the character region is replaced with gradation image C to convert colors.

That is, with the image processing according to this embodiment using the mask images, readability can further be increased while high security with the ground pattern is maintained.

It is to be noted that, though the image as the element included in the document region other than the ground portion separated in image divider 303 is enlarged in image enlarger 319 and the region of the enlarged portion is replaced with, for example, mask image C which is gradation image C in enlargement converter 321 in this embodiment as one specific example, a similar effect can be obtained with another specific example in which the image as the element included in the document region other than the ground portion is reduced and the region of the reduced portion is replaced with, for example, mask image C which is gradation image C.

Figure 26A:
FIGS. 26A-26C show other specific examples of gradation images A-C.
Figure 26B:
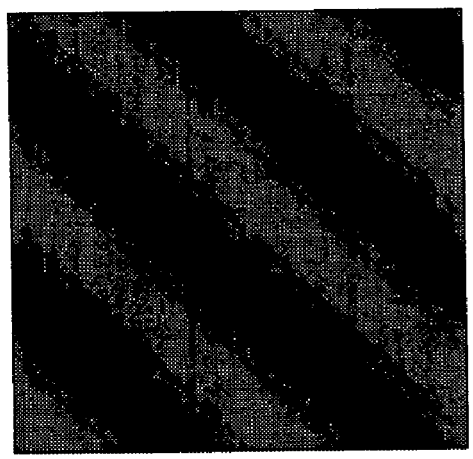
Figure 26C:
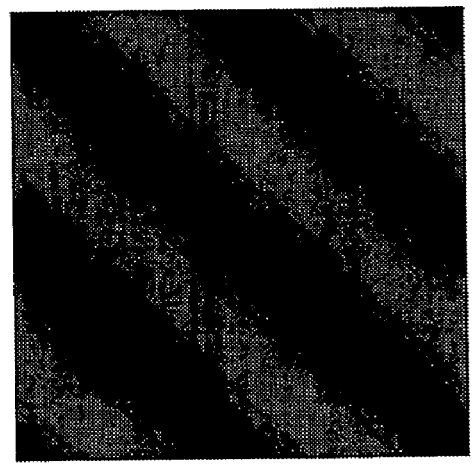

FIGS. 26A-26C show other specific examples of gradation images A-C which are mask images used in image processor 300.

As shown in FIGS. 26A-26C, gradation images each having different arrangement of colors varying with small intervals are also suitable as gradation images A-C.

Figure 27:
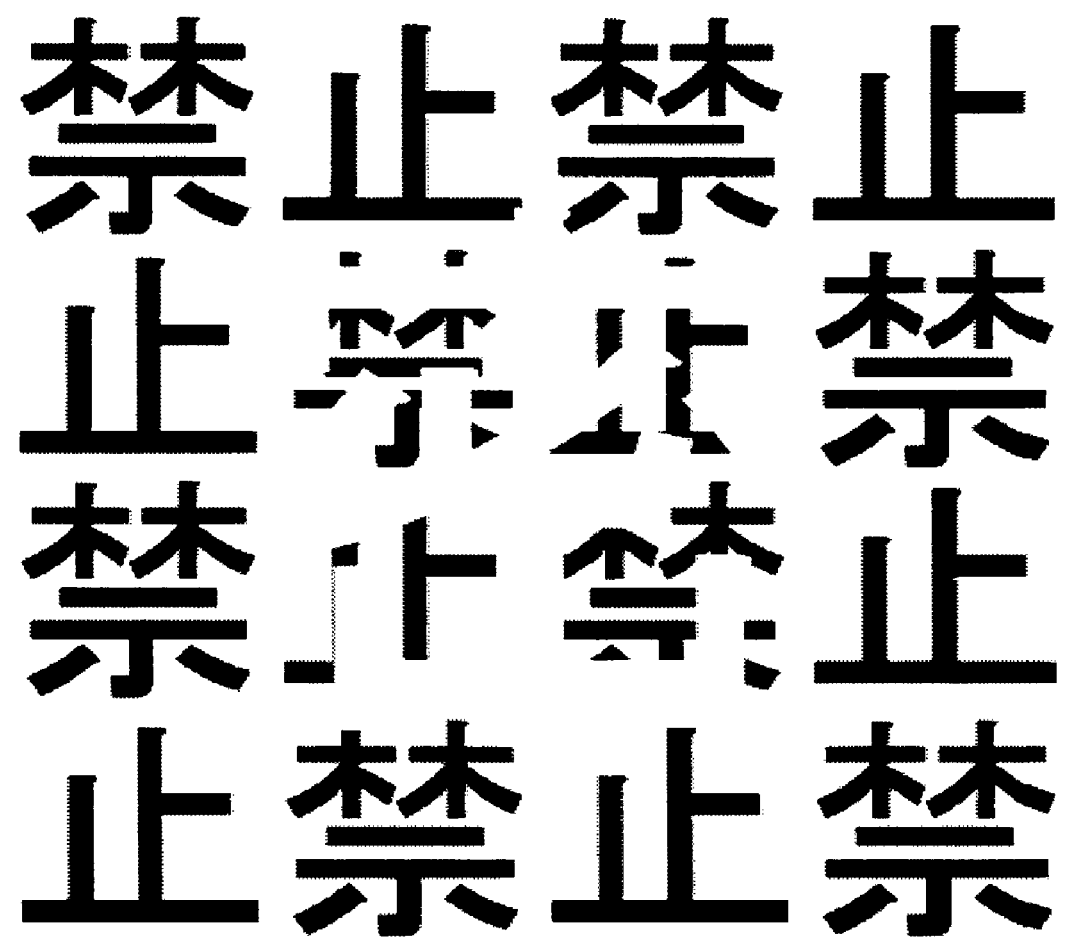
Figure 28:
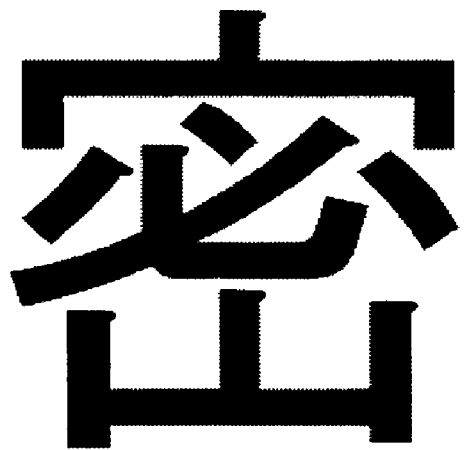
FIG. 28 shows a specific example of an image obtained by division in step S201.
Figure 29:
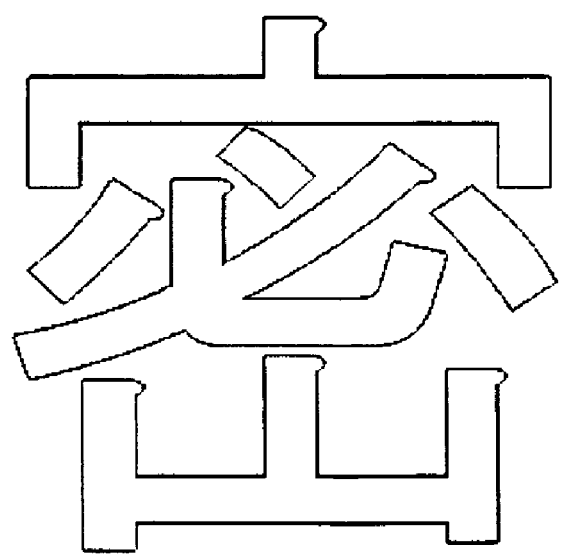
FIG. 29 shows a specific example of an image obtained in step S215.
Figures 30, 31:
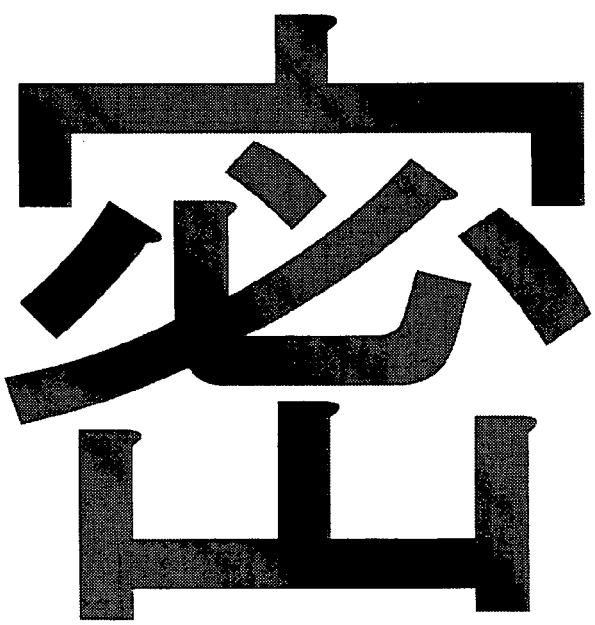
FIG. 30 shows a specific example of an image obtained in step S209.
FIG. 31 shows a specific example of an image obtained in step S211.
Figure 32:
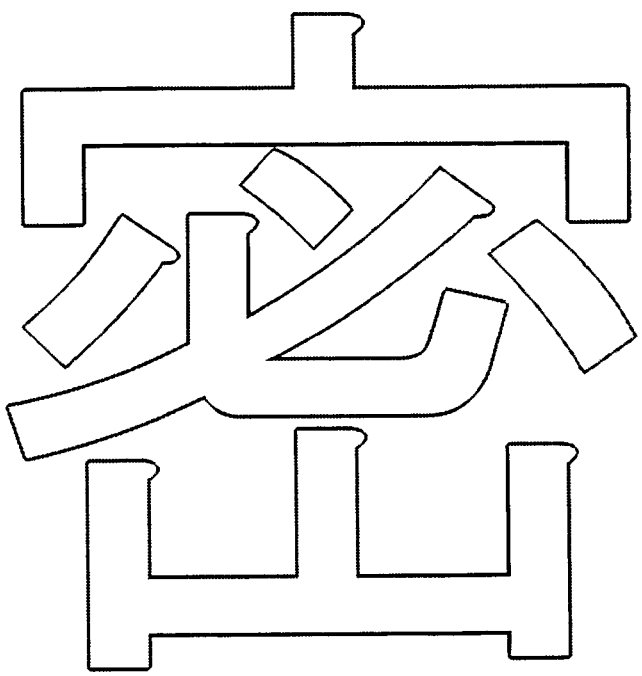
FIG. 32 shows a specific example of an image obtained in step S219.
Figure 33:
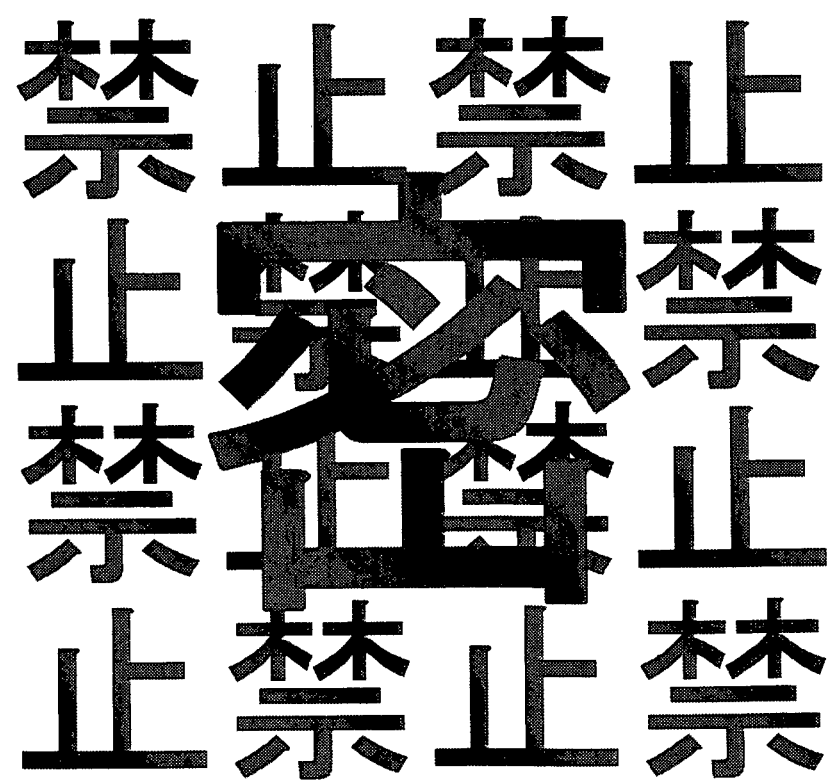
FIG. 33 shows a specific example of an image output from MFP 20.

More specifically, assuming that a latent image extracted from a ground portion including a ground pattern in step S205 and subject to lightness correction in step S207 is as shown in FIG. 27, that a document region included in a document image other than the ground portion, which is separated in step S203, is as shown in FIG. 28, and that the document region enlarged in step S215 is as shown in FIG. 29, then the latent image is replaced with gradation image A (FIG. 26A) in step S209 to convert colors as shown in FIG. 30, the document region is replaced with gradation image B (FIG. 26B) in step S211 to convert colors as shown in FIG. 31, and an enlargement region corresponding to an outline of the document region is replaced with gradation image C (FIG. 26C) in step S219 to convert colors as shown in FIG. 32. Thereafter, these images are superposed in step S213 to output an image as shown in FIG. 33.

Figures 34, 35:
FIG. 34 shows a specific example of an image obtained by division in step S201.
FIG. 35 shows a specific example of an image output from MFP 20.

Similarly, when a document region included in a document image other than a ground portion, which is separated in step S203, is as shown in FIG. 34, then the images are superposed in step S213 to output an image as shown in FIG. 35.

As described above, when colors are converted in the image processing using gradation images A-C each having different arrangement of colors varying with small intervals, one element may contain a color variation with a high possibility even when each element of the latent image or character region included in the document image having the ground pattern has a small size. With this, a specific element (the latent image or character) cannot be readily deleted with the image processing, which further increases security.

It is to be noted that, though the image processing apparatus according to the present invention is described as MFP 20 in this embodiment, it may be implemented with information processing terminal 10. In this situation, a program for performing the image processing is stored in ROM 102 of information processing terminal 10 or the like, and the image processing is performed by CPU 100 reading and executing the program stored in ROM 102 or the like. In addition, the mask images used in the image processing may be stored in HDD 112 of information processing terminal 10 or the like, or may be stored in HDD 208 of MFP 20 or another device and obtained via network 30.

Furthermore, a method of image processing executed in MFP 20 as the image processing apparatus according to this embodiment can also be provided as a program. The program as such can be recorded in a computer-readable record medium such as a flexible disk attached to a computer, a CD-ROM (Compact Disk-Read Only Memory), an ROM, an RAM, or a memory card, and can be provided as a program product. Alternatively, the program can be provided by recording it in a record medium such as a hard disk included in a computer. The program can also be provided with downloading through a network.

The program product provided is installed into a program storage unit such as a hard disk for execution. The program product includes the program itself and the record medium recording the program.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image processing apparatus, comprising:
   a ground pattern detector for detecting whether a ground pattern is included in an image input;
   a latent image extractor for extracting a latent image included in said ground pattern from a ground of said image input when said ground pattern detector detects the ground pattern form said image input;
   a lightness corrector for correcting lightness of said latent image to become closer to lightness of an element of said image other than said ground;
   a latent image converter for converting a color of said latent image having corrected lightness into a first plurality of colors formed with a plurality of different colors excluding a background color for outputting and varying from one to another via a neutral color; and
   a converter for converting a color of said element of said image other than said ground into a second plurality of colors formed with said plurality of different colors as said first plurality of colors and varying in a manner different from that of said first plurality of colors.

2. The image processing apparatus according to claim 1, wherein
   each of said first plurality of colors and said second plurality of colors have continuous gradation in color.

3. The image processing apparatus according to claim 2, wherein
   said first plurality of colors and said second plurality of colors have different directions of said gradation.

4. The image processing apparatus according to claim 1, wherein
   the plurality of different colors forming said first plurality of colors and said second plurality of colors are colors having at least a prescribed chroma and at least a prescribed difference in hues.

5. The image processing apparatus according to claim 1, further comprising:
   an enlarger/reducer for enlarging or reducing said element of said image other than said ground; and
   an enlargement/reduction region converter for converting a color of a region enlarged or reduced in said enlarger/reducer into a third plurality of colors formed with said plurality of different colors as said first plurality of colors and said second plurality of colors and varying in a manner different from those of said first plurality of colors and said second plurality of colors.

6. The image processing apparatus according to claim 5, wherein
   each of said first plurality of colors, said second plurality of colors and said third plurality of colors have continuous gradation in color, and said first plurality of colors and said third plurality of colors have the same form of gradation and different arrangements of said plurality of different colors.

7. A computer readable medium containing a program for execution by a computer for image processing in an image processing apparatus including an image input unit and an image output unit; wherein
   said image processing includes the steps of
   detecting whether a ground pattern is included in an image input from said image input unit,
   extracting a latent image included in said ground pattern from a ground of said image input when said ground pattern from said image input is detected, correcting lightness of said latent image to become closer to lightness of an element of said image other than said ground, converting a color of said latent image having corrected lightness into a first plurality of colors formed with a plurality of different colors excluding a background color for outputting at said image output unit and varying from one to another via a neutral color, and converting a color of said element of said image other than said ground into a second plurality of colors formed with said plurality of different colors as said first plurality of colors and varying in a manner different from that of said first plurality of colors.

8. The computer readable medium according to claim 7, wherein
each of said first plurality of colors and said second plurality of colors have continuous gradation in color.

9. The computer readable medium according to claim 8, wherein
said first plurality of colors and said second plurality of colors have different directions of said gradation.

10. The computer readable medium according to claim 7, wherein
the plurality of different colors forming said first plurality of colors and said second plurality of colors are colors having at least a prescribed chroma and at least a prescribed difference in hues.

11. The computer readable medium according to claim 7, wherein
said image processing further includes the steps of
enlarging or reducing said element of said image other than said ground, and converting a color of a region enlarged or reduced in said step of enlarging or reducing into a third plurality of colors formed with said plurality of different colors as said first plurality of colors and said second plurality of colors and varying in a manner different from those of said first plurality of colors and said second plurality of colors.

12. The computer readable medium according to claim 11, wherein
each of said first plurality of colors, said second plurality of colors and said third plurality of colors have continuous gradation in color, and said first plurality of colors and said third plurality of colors have the same form of gradation and different arrangements of said plurality of different colors.

13. The image processing apparatus according to claim 1, wherein
said ground pattern detector for detecting whether a ground pattern is included in said image input is based on a calculated average RGB value of a ground region of the image input.

14. The computer readable medium according to claim 7, wherein
detecting whether said ground pattern is included in said image input from said image input unit is based on a calculated average RGB value of a ground region of the image input.

* * * * *